United States Patent
Rapaka et al.

(10) Patent No.: US 10,212,445 B2
(45) Date of Patent: Feb. 19, 2019

(54) INTRA BLOCK COPY PREDICTION RESTRICTIONS FOR PARALLEL PROCESSING

(71) Applicant: QUALCOMM Incorporated, San Diego, CA (US)

(72) Inventors: Krishnakanth Rapaka, San Diego, CA (US); Chao Pang, Marina del Ray, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 14/878,825

(22) Filed: Oct. 8, 2015

(65) Prior Publication Data

US 2016/0105682 A1 Apr. 14, 2016

Related U.S. Application Data

(60) Provisional application No. 62/062,122, filed on Oct. 9, 2014.

(51) Int. Cl.
*H04N 19/50* (2014.01)
*H04N 19/44* (2014.01)
(Continued)

(52) U.S. Cl.
CPC .............. *H04N 19/50* (2014.11); *H04N 19/11* (2014.11); *H04N 19/157* (2014.11);
(Continued)

(58) Field of Classification Search
CPC ...... H04N 19/50; H04N 19/11; H04N 19/157; H04N 19/174; H04N 19/436; H04N 19/44;
(Continued)

(56) References Cited

U.S. PATENT DOCUMENTS

2012/0086587 A1* 4/2012 Sze ................ H03M 7/4018
341/107
2012/0183074 A1* 7/2012 Fuldseth .............. H04N 19/119
375/240.24
(Continued)

OTHER PUBLICATIONS

Guillaume Laroche et al., "AHG14; On IBC Constraint for Wavefront Parallel Processing" JCTVC-S0070, Fr. Oct. 17-Oct. 24, 2014.*
Stefan Radicke et al., "A Muti-Threaded Full-Feature HEVC Encoder Based on Wavefront Parallel Processing" School of Computing, University of the West Scotland.*
(Continued)

*Primary Examiner* — Dramos Kalapodas
(74) *Attorney, Agent, or Firm* — Shumaker & Sieffert, P.A.

(57) ABSTRACT

According to techniques of this disclosure, a video decoder can be configured to, for one or more blocks coded with wavefront parallel processing enabled, determine a coding tree block (CTB) delay, wherein the CTB delay identifies a delay between when a first row of CTBs starts being decoded and when a second row of CTBs below the first row of CTBs starts being decoded; for a current block of video data coded in an intra-block copy (IBC) mode and coded with wavefront parallel processing disabled, determine an IBC prediction region for the current block within a picture that includes the current block based on the CTB delay that was determined for the one or more blocks coded with wavefront parallel processing enabled; identify, from within the determined IBC prediction region for the current block, a predictive block for the current block; and IBC decode the current block based on the predictive block.

28 Claims, 18 Drawing Sheets

(51) Int. Cl.
| | |
|---|---|
| *H04N 19/593* | (2014.01) |
| *H04N 19/11* | (2014.01) |
| *H04N 19/157* | (2014.01) |
| *H04N 19/174* | (2014.01) |
| *H04N 19/436* | (2014.01) |
| *H04N 19/55* | (2014.01) |

(52) U.S. Cl.
CPC ......... *H04N 19/174* (2014.11); *H04N 19/436* (2014.11); *H04N 19/44* (2014.11); *H04N 19/55* (2014.11); *H04N 19/593* (2014.11)

(58) Field of Classification Search
CPC ...... H04N 19/55; H04N 19/593; H04N 19/13; H04N 19/00884; H04N 19/91; H04N 19/46; H04N 19/188; H04N 19/463; H04N 19/70; H04N 19/00327; H04N 19/00545; H04N 19/90; H04N 19/129; H04N 19/176; H04N 19/186; H04N 19/96; H04N 19/167; H04N 19/107; H04N 19/17; H04N 19/103; H04N 19/30; H04N 19/597; H04N 19/433; H04N 19/152; H04N 19/423; H04N 19/66; H04N 19/521; H04N 19/105; H04N 19/159; H04N 19/184; H04N 19/513
See application file for complete search history.

(56) References Cited

U.S. PATENT DOCUMENTS

| | | | |
|---|---|---|---|
| 2012/0230428 A1* | 9/2012 | Segall | H04N 19/176 375/240.25 |
| 2013/0336403 A1* | 12/2013 | Naing | H04N 19/52 375/240.16 |
| 2014/0093180 A1* | 4/2014 | Esenlik | H04N 19/70 382/233 |
| 2015/0103921 A1* | 4/2015 | Hannuksela | H04N 19/152 375/240.26 |
| 2015/0264396 A1* | 9/2015 | Zhang | H04N 19/567 375/240.16 |
| 2015/0350674 A1* | 12/2015 | Laroche | H04N 19/593 375/240.16 |
| 2016/0100163 A1* | 4/2016 | Rapaka | H04N 19/117 375/240.16 |
| 2016/0100189 A1 | 4/2016 | Pang et al. | |
| 2016/0165248 A1* | 6/2016 | Lainema | H04N 19/70 375/240.08 |
| 2016/0227245 A1* | 8/2016 | Liu | H04N 19/52 |
| 2016/0330452 A1* | 11/2016 | Laroche | H04N 19/13 |
| 2017/0070748 A1* | 3/2017 | Li | H04N 19/176 |
| 2017/0094271 A1* | 3/2017 | Liu | H04N 19/105 |
| 2017/0134724 A1* | 5/2017 | Liu | H04N 19/105 |
| 2017/0142418 A1* | 5/2017 | Li | H04N 19/70 |
| 2017/0238001 A1* | 8/2017 | Li | H04N 19/436 375/240.12 |

OTHER PUBLICATIONS

Keji Chen "Towards Efficient Wavefront Parallel Encoding of HEVC: Parallelism Analysis Inprovement" 2014 IEEE, 978-1-4799-5896 (Year: 2014).*

Hyunho Jo; "Hybrid Parallelization for HEVC Decoder"; CISP 2013 IEEE 978-1-4799-2764 (Year: 2013).*

Do-Kyoung Kwon; "fAST Intra Block Copy (INTRA ibc) Search for HEVC Screen Content Coding", 2014 IEEE; 978-1-4799-3432 (Year: 2014).*

Guillaume Laroche et al,, "AHG14; On IBC Constraint for Wavefront Parallel Processing" JCTVC-S0070, Fr. Oct. 17-Oct. 24, 2014 (Year: 2014).*

Stefan Radicke et al,, "A Muti-Threaded Full-Feature HEVC Encoder Based on Wavefront Parallel Processing" School of Computing, University of the West Scotland (Year: 2014).*

Wiegand et al., "WD1 : Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Gisquet, et al., "Non-SCCE1: IBC BV Throughput Issue", JCT-VC Meeting, Jun. 30-Jul. 9, 2014, Sapporo, (Joint Collaborative Team on Video Coding of ISO/IEC JTC1/SC29/WG11 and ITU-T SG.16), URL:HTTP://WFTP3.ITU.INT/AV-ARCH/JCTVC-SITE/, No. JCTVC-R0089-v4, Jul. 4, 2014, XP030116343, 4 pp.

Laroche, et al., "AHG14: On IBC constraint for Wave front Parallel Processing," JCT-VC Meeting, Oct. 17-24, 2014; Strasbourg, (Joint Collaborative Team on Video Coding of ISO/IEC JTC1/SC29/WG11 and ITU-T SG.16), URL:HTTP://WFTP3.ITU.INT/AV-ARCH/JCTVC-SITE/, No. JCTVC-S0070, Oct. 7, 2014, XP030116810; 5 pp.

(56) References Cited

OTHER PUBLICATIONS

Rapaka, et al., "Bandwidth Reduction Method for Intra Block Copy", JCT-VC Meeting, Oct. 17-24, 2014, Strasbourg, (Joint Collaborative Team on Video Coding of ISO/IEC JTC1/SC29/WG11 and ITU-T SG.16), URL:HTTP://WFTP3.ITU.INT/AV-ARCH/JCTVC-SITE/, No. JCTVC-S0145, Oct. 8, 2014, XP030116914, 3 pp.

Rapaka, et al., "On Parallel Processing Capability of Intra Block Copy", JCT-VC Meeting; Oct. 17-24, 2014, Strasbourg, (Joint Collaborative Team on Video Coding of ISO/IEC JTC1/SC29/WG11 and ITU-T SG.16, URL:HTTP://WFTP3.ITU.INT/AV-ARCH/JCTVC-SITE/, No. JCTVC-S0220-v2, Oct. 18, 2014, XP030117009, 8 pp.

Zhou, "Non-SCCE1: Additional Test Results on Intra Block Copy (IBC)," JCT-VC Meeting, Jun. 30-Jul. 9, 2014, Sapporo, (Joint Collaborative Team on Video Coding of ISO/IEC JTC1/SC29/WG11 and ITU-T SG.16), URL:HTTP://WFTP3.ITU.INT/AA-ARCH/JCTVC-SITE/, No. JCTVC-R0208, Jun. 21, 2014, XP030116503, 4 pp.

Wang, et al., "High Efficiency Video Coding (HEVC) Defect Report 2," JCT-VC Meeting; Oct. 23-Nov. 1, 2013; (Joint Collaborative Team on Video Coding of ISO/IEC JTC1/SC29/WG11 and ITU-T SG.16); No. JCTVC-)) O1003_v2, Nov. 24, 2013; 311 pp.

Flynn, et al., "High Efficiency Video Coding (HEVC) Range Extensions text specification: Draft 7," JCT-VC Meeting; Mar. 27-Apr. 4, 2014; (Joint Collaborative Team on Video Coding of ISO/IEC JTC1/SC29/WG11 and ITU-T SG.16); No. JCTVC-Q1005_v4, Apr. 10, 2014; 376 pp.

Joshi, et al., "High Efficiency Video Coding (HEVC) Screen Content Coding: Draft 1," JCT-VC Meeting; Jun. 30-Jul. 3, 2014; (Joint Collaborative Team on Video Coding of ISO/IEC JTC1/SC29/WG11 and ITU-T SG.16); No. JCTVC-R1005_v3, Sep. 27, 2014; 362 pp.

Pang, et al., "Non-CE2: Intra block copy with Inter signaling," JCT-VC Meeting; Oct. 17-24, 2014; (Joint Collaborative Team on Video Coding of ISO/IEC JTC1/SC29/WG11 and ITU-T SG.16); No. JCTVC-S0113_v4; Oct. 21, 2014; 4 pp.

He, et al., "Non-CE2: Unification of IntraBC mode with inter mode," JCT-VC Meeting; Oct. 17-24, 2014; (Joint Collaborative Team on Video Coding of ISO/IEC JTC1/SC29/WG11 and ITU-T SG.16); No. JCTVC-S0172; Oct. 19, 2014; 8 pp.

Budagavi, et al., "AHG8: Video coding using Intra motion compensation," JCT-VC Meeting; Apr. 18-26, 2013; (Joint Collaborative Team on Video Coding of ISO/IEC JTC1/SC29/WG11 and ITU-T SG.16); No. JCTVC-M0350; Apr. 12, 2013; 5 pp.

ITU-T H.223, Series H: Audiovisual and Multimedia Systems, Infrastructure of audiovisual services—Tranmission multiplexing and synchronization, Multiplexing protocol for low bit rate multimedia communication; Jul. 2001; 74 pp.

Yu et al., "Requirements for an extension of HEVC for coding of screen content," ISO/IEC JTC 1/SC 29/WG 11 Requirements subgroup, San Jose, California, USA, document MPEG2013/N14174, Jan. 2014, 5 pp.

International Search Report and Written Opinion from International Application No. PCT/US2015/054967, dated Jan. 27, 2016, 14 pp.

Response to Written Opinion dated Jan. 27, 2016 from International Application No. PCT/US2015/054967, filed on Jul. 11, 2016, 4 pp.

Second Written Opinion from International Application No. PCT/US2015/054967, dated Sep. 7, 2016, 7 pp.

Response to Second Written Opinion dated Sep. 7, 2016 from International Application No. PCT/US2015/054967, filed on Nov. 7, 2016, 5 pp.

Wang, et al., "High Efficiency Video Coding (HEVC) Defect Report 4," Mar. 27-Apr. 4, 2014 (Joint Collaborative Team on Video Coding of ISO/IEC JTC1/SC29/WG11 and ITU-T SG.16); May 28, 2014, document No. JCTVC-Q1003, 314 pp.

International Preliminary Report on Patentability from International Application No. PCT/US2015/054967, dated Dec. 16, 2016, 13 pp.

\* cited by examiner

4:2:0 sample format

4:2:2 sample format

4:4:4 sample format

16x16 CU with 4:2:2 Sample Formatting

○ Luma Sample
⊗ Chroma Samples

INTRA BLOCK COPY PREDICTION RESTRICTIONS FOR PARALLEL PROCESSING

This application claims the benefit of U.S. Provisional Patent Application 62/062,122, filed Oct. 9, 2014, the entire content of which is incorporated by reference herein.

TECHNICAL FIELD

This disclosure relates to video coding and, more particularly, prediction of video blocks based on other video blocks.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard (H.265), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure introduces techniques to potentially enhance parallel processing when IBC mode is enabled.

In one example, a method of decoding video data includes, for one or more blocks coded with wavefront parallel processing enabled, determining a coding tree block (CTB) delay, wherein the CTB delay identifies a delay between when a first row of CTBs starts being decoded and when a second row of CTBs below the first row of CTBs starts being decoded; for a current block of video data coded in an intra-block copy (IBC) mode and coded with wavefront parallel processing disabled, determining an IBC prediction region for the current block within a picture that includes the current block based on the CTB delay that was determined for the one or more blocks coded with wavefront parallel processing enabled; identifying, from within the determined IBC prediction region for the current block, a predictive block for the current block; and IBC decoding the current block based on the predictive block.

In another example, a method of encoding video data includes, for one or more blocks coded with wavefront parallel processing enabled, determining a coding tree block (CTB) delay, wherein the CTB delay identifies a delay between when a first row of CTBs starts being decoded and when a second row of CTBs below the first row of CTBs starts being decoded; for a first block of video data coded in an intra-block copy (IBC) mode and coded with wavefront parallel processing disabled, determining an IBC prediction region for the first block based on the CTB delay; identifying, from within the IBC prediction region for the first block, a predictive block for the first block; and generating syntax to indicate a block vector for locating the predictive block.

In another example, a device for performing video coding includes a memory storing video data and one or more processors configured to: determine a coding tree block (CTB) delay for one or more blocks coded with wavefront parallel processing enabled, wherein the CTB delay identifies a delay between when a first row of CTBs starts being decoded and when a second row of CTBs below the first row of CTBs starts being decoded; for a current block of video data coded in an intra-block copy (IBC) mode and coded with wavefront parallel processing disabled, determine an IBC prediction region for the current block within a picture that includes the current block based on the CTB delay that was determined for the one or more blocks coded with wavefront parallel processing enabled; identify a predictive block for the current block from within the determined IBC prediction region for the current block; and IBC decode the current block based on the predictive block.

In another example, a device for performing video encoding includes a memory to store video data and one or more processors configured to determine a coding tree block (CTB) delay for one or more blocks coded with wavefront parallel processing enabled, wherein the CTB delay identifies a delay between when a first row of CTBs starts being decoded and when a second row of CTBs below the first row of CTBs starts being decoded; for a first block of video data coded in an intra-block copy (IBC) mode and coded with wavefront parallel processing disabled, determine an IBC prediction region for the first block based on the CTB delay; identify, from within the IBC prediction region for the first block, a predictive block for the first block; and generate syntax to indicate a block vector for locating the predictive block.

In another example, an apparatus for decoding video data includes means for determining a coding tree block (CTB)

delay for one or more blocks coded with wavefront parallel processing enabled, wherein the CTB delay identifies a delay between when a first row of CTBs starts being decoded and when a second row of CTBs below the first row of CTBs starts being decoded; for a current block of video data coded in an intra-block copy (IBC) mode and coded with wavefront parallel processing disabled, means for determining an IBC prediction region for the current block within a picture that includes the current block based on the CTB delay that was determined for the one or more blocks coded with wavefront parallel processing enabled; means for identifying, from within the determined IBC prediction region for the current block, a predictive block for the current block; and means for IBC decoding the current block based on the predictive block.

In another example, a computer readable storage medium stores instructions that when executed by one or more processors cause the one or more processors to determine a coding tree block (CTB) delay for one or more blocks coded with wavefront parallel processing enabled, wherein the CTB delay identifies a delay between when a first row of CTBs starts being decoded and when a second row of CTBs below the first row of CTBs starts being decoded; for a current block of video data coded in an intra-block copy (IBC) mode and coded with wavefront parallel processing disabled, determine an IBC prediction region for the current block within a picture that includes the current block based on the CTB delay that was determined for the one or more blocks coded with wavefront parallel processing enabled; identify a predictive block for the current block from within the determined IBC prediction region for the current block; and IBC decode the current block based on the predictive block.

In another example, an apparatus for encoding video data includes means for determining a coding tree block (CTB) delay for one or more blocks coded with wavefront parallel processing enabled, wherein the CTB delay identifies a delay between when a first row of CTBs starts being decoded and when a second row of CTBs below the first row of CTBs starts being decoded; for a first block of video data coded in an intra-block copy (IBC) mode and coded with wavefront parallel processing disabled, means for determining an IBC prediction region for the first block based on the CTB delay; means for identifying, from within the IBC prediction region for the first block, a predictive block for the first block; and means for generating syntax to indicate a block vector for locating the predictive block.

In another example, a computer readable storage medium stores instructions that when executed by one or more processors cause the one or more processors to determine a coding tree block (CTB) delay for one or more blocks coded with wavefront parallel processing enabled, wherein the CTB delay identifies a delay between when a first row of CTBs starts being decoded and when a second row of CTBs below the first row of CTBs starts being decoded; for a first block of video data coded in an intra-block copy (IBC) mode and coded with wavefront parallel processing disabled, determine an IBC prediction region for the first block based on the CTB delay; identify, from within the IBC prediction region for the first block, a predictive block for the first block; and generate syntax to indicate a block vector for locating the predictive block.

The details of one or more aspects of the techniques are set forth in the accompanying drawings and the description below. Other features, objects, and advantages of the techniques will be apparent from the description and drawings, and from the claims.

BRIEF DESCRIPTION OF DRAWINGS

FIG. 6 shows an example of raster scan of a picture when tiles are used.

Figure 11:
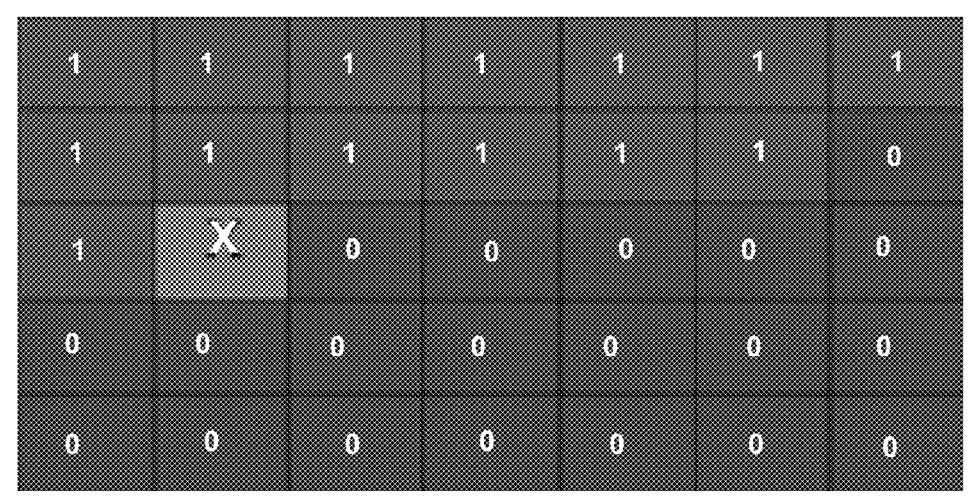
Figure 12:
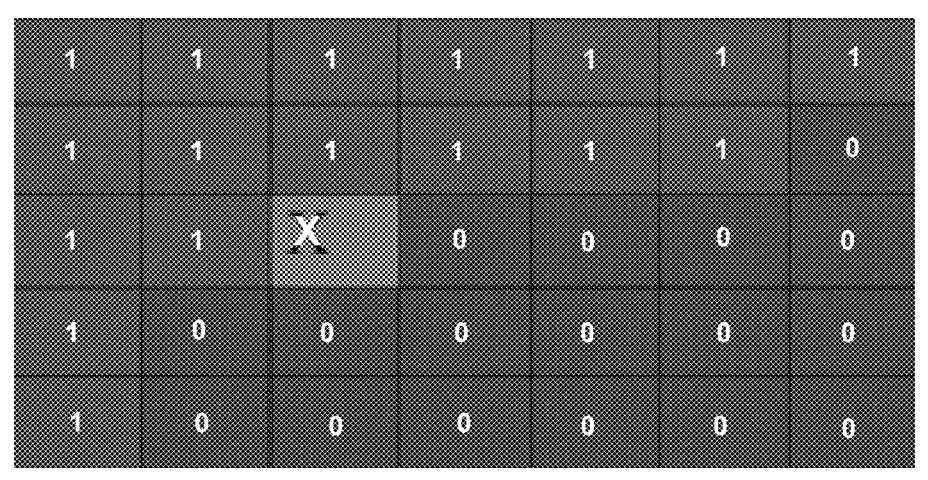

FIGS. 8-12 show valid prediction regions for various examples described in this disclosure.

DETAILED DESCRIPTION

Figure 1:
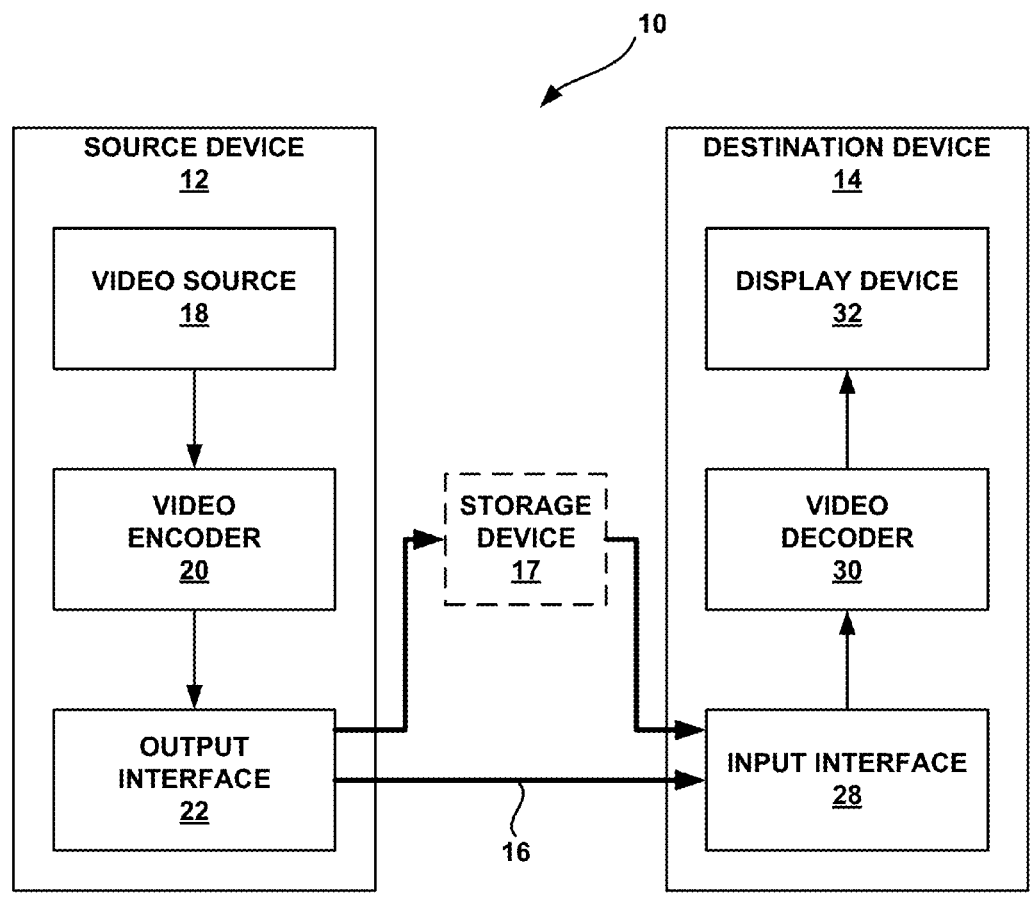
FIG. 1 is a block diagram illustrating an example video encoding and decoding system that may utilize the techniques described in this disclosure.

Various video coding standards, including the recently developed High Efficiency Video Coding (HEVC) standard include predictive coding modes for video blocks, where a block currently being coded is predicted based on an already coded block of video data. In an intra prediction mode, the current block is predicted based on one or more previously coded, neighboring blocks in the same picture as the current block, while in an inter prediction mode the current block is predicted based on an already coded block in a different picture. In inter prediction mode, the process of determining a block of a previously coded frame to use as a predictive block is sometimes referred to as motion estimation, which is generally performed by a video encoder, and the process of identifying and retrieving a predictive block is sometimes referred to as motion compensation, which is performed by both video encoders and video decoders.

A video encoder typically determines how to code a sequence of video data by coding the video using multiple coding scenarios and identifying the coding scenario that produces a desirable rate-distortion tradeoff. When testing intra prediction coding scenarios for a particular video block, a video encoder typically tests the neighboring row of pixels (i.e. the row of pixels immediately above the block being coded) and tests the neighboring column of pixels (i.e. the column of pixels immediately to the left of the block being coded). In contrast, when testing inter prediction scenarios, the video encoder typically identifies candidate predictive blocks in a much larger search area, where the search area corresponds to video blocks in previously coded frames of video data.

It has been discovered, however, that for certain types of video images, such as video images that include text, symbols, or repetitive patterns, coding gains can be achieved relative to intra prediction and inter prediction by using an intra block copy (IBC) mode, which is also sometimes referred to as an intra motion compensation (IMC) mode. In the development of various coding standards, the term IMC mode was originally used, but later modified to IBC mode. In an IBC mode, a video encoder searches for a predictive block in the same frame or picture as the block being coded, as in an intra prediction mode, but the video encoder searches a wider search area and not just the neighboring rows and columns of pixels.

In IBC mode, the video encoder may determine an offset vector, also referred to sometimes as a motion vector or block vector, for identifying the predictive block within the same frame or picture as the block being predicted. The offset vector includes, for example, an x-component and a y-component, where the x-component identifies the horizontal displacement between a video block being predicted and the predictive block, and where the y-component identifies a vertical displacement between the video block being predicted and the predictive block. The video encoder signals, in the encoded bitstream, the determined offset vector so that a video decoder, when decoding the encoded bitstream, can identify the same predictive block selected by the video encoder.

Various video coding standards, including HEVC, also support parallel processing mechanisms such as tiles and wavefront parallel processing so that different blocks within the same picture may be decoded at the same time. Tiles offer rectangular partitioning (with coded tree block (CTB) granularity) of a picture into multiple independently decodable (including parsing and reconstruction) regions, such that a video decoder can decode multiple tiles in parallel. Unlike tiles, wavefronts are not independently decodable, but a video decoder may still be able to decode multiple wavefronts in parallel by staggering the time at which decoding of the various wavefronts start. For example, if a video decoder decodes two blocks of a first wavefront before starting to decode a second wavefront below the first wavefront, then the video decoder can ensure that any information of the first wavefront necessary for the decoding the second wavefront is already decoded, and thus available for use in decoding the second wavefront.

This disclosure introduces techniques to potentially enhance parallel processing when IBC mode is enabled. More specifically, this disclosure introduces restrictions on IBC block vectors (BVs) such that a decoder can process, in parallel, multiple CTUs in non-raster scan order, which is sometimes referred to as wavefront parallel processing. The techniques of this disclosure are directed to, but not limited to, screen content coding, including the support of possibly high bit depth (more than 8 bit), different chroma sampling format such as 4:4:4, 4:2:2, 4:2:0, 4:0:0 and etc.

FIG. 1 is a block diagram illustrating an example video encoding and decoding system 10 that may utilize the techniques described in this disclosure, including techniques for coding blocks in an IBC mode and techniques for parallel processing. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 17. Similarly, encoded data may be accessed from storage device 17 by input interface. Storage device 17 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 17 may correspond to a file server or another intermediate storage device that may hold the encoded video generated by source device 12. Destination device 14 may access stored video data from storage device 17 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 17 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 17 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 17, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as HEVC, and may conform to the HEVC Test Model (HM). A working draft of the HEVC standard, referred to as "HEVC Working Draft 10" or "HEVC WD10," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013. Another HEVC draft specification is available from http://phenix.int-evry.fr/jct/doc_end_user/documents/15_Geneva/wg11/JCTVC-O1003-v2.zip. The techniques described in this disclosure may also operate according to extensions of the HEVC standard that are currently in development.

Alternatively or additionally, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

The design of the HEVC has been recently finalized by the JCT-VC of ITU-T Video Coding Experts Group (VCEG) and ISO/IEC Motion Picture Experts Group (MPEG). The Range Extensions to HEVC, referred to as HEVC RExt, are also being developed by the JCT-VC. A recent Working Draft (WD) of Range extensions, referred to as RExt WD7 hereinafter, is available from http://phenix.int-evry.fr/jct/doc_end_user/documents/17_Valencia/wg11/JCTVC-Q1005-v4.zip.

This disclosure will generally refer to the recently finalized HEVC specification text as HEVC version 1 or base HEVC. The range extension specification may become the version 2 of the HEVC. With respect to many coding tools, such as motion vector prediction, HEVC version 1 and the range extension specification are technically similar. Therefore whenever this disclosure describes changes relative to HEVC version 1, the same changes may also apply to the range extension specification, which generally includes the base HEVC specification, plus some additional coding tools. Furthermore, it can generally be assumed that HEVC version 1 modules may also be incorporated into a decoder implementing the HEVC range extension.

New coding tools for screen-content material such as text and graphics with motion are currently in development and being contemplated for inclusion in future video coding standards, including future version of HEVC. These new coding tools potentially improve coding efficiency for screen content. As there is evidence that significant improvements in coding efficiency may be obtained by exploiting the characteristics of screen content with novel dedicated coding tools, a Call for Proposals (CfP) has been issued with the target of possibly developing future extensions of the HEVC standard including specific tools for SCC). Companies and organizations have been invited to submit proposals in response to this Call. The use cases and requirements of this CfP are described in MPEG document N14174. During the 17$^{th}$ JCT-VC meeting, SCC test model (SCM) is established. A recent Working Draft (WD) of SCC is available from http://phenix.int-evry.fr/jct/doc_end_user/documents/18_Sapporo/wg11/JCTVC-R1005-v3.zip.

It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block (CTB) of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks (CTBs) of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

A video sampling format, which may also be referred to as a chroma format, may define the number of chroma samples included in a CU with respect to the number of luma samples included in a CU. Depending on the video sampling format for the chroma components, the size, in terms of number of samples, of the U and V components may be the same as or different from the size of the Y component. In the HEVC standard, a value called chroma_format_idc is defined to indicate different sampling formats of the chroma components, relative to the luma component. In HEVC, chroma_format_idc is signaled in the SPS. Table 1 illustrates the relationship between values of chroma_format_idc and associated chroma formats.

TABLE 1

| different chroma formats defined in HEVC | | | |
|---|---|---|---|
| chroma_format_idc | chroma format | SubWidthC | SubHeightC |
| 0 | Monochrome | — | — |
| 1 | 4:2:0 | 2 | 2 |
| 2 | 4:2:2 | 2 | 1 |
| 3 | 4:4:4 | 1 | 1 |

In Table 1, the variables SubWidthC and SubHeightC can be used to indicate the horizontal and vertical sampling rate ratio between the number of samples for the luma component and the number of samples for each chroma component. In the chroma formats described in Table 1, the two chroma components have the same sampling rate. Thus, in 4:2:0 sampling, each of the two chroma arrays has half the height and half the width of the luma array, while in 4:2:2 sampling, each of the two chroma arrays has the same height and half the width of the luma array. In 4:4:4 sampling, each of the two chroma arrays, may have the same height and width as the luma array, or in some instances, the three color planes may all be separately processed as monochrome sampled pictures.

In the example of Table 1, for the 4:2:0 format, the sampling rate for the luma component is twice that of the chroma components for both the horizontal and vertical directions. As a result, for a coding unit formatted according to the 4:2:0 format, the width and height of an array of samples for the luma component are twice that of each array of samples for the chroma components. Similarly, for a coding unit formatted according to the 4:2:2 format, the width of an array of samples for the luma component is twice that of the width of an array of samples for each chroma component, but the height of the array of samples for the luma component is equal to the height of an array of samples for each chroma component. For a coding unit formatted according to the 4:4:4 format, an array of samples for the luma component has the same width and height as an array of samples for each chroma component. It should be noted that in addition to the YUV color space, video data can be defined according to an RGB space color. In this manner, the chroma formats described herein may apply to either the YUV or RGB color space. RGB chroma formats are typically sampled such that the number of red samples, the number of green samples and the number of blue samples are equal. Thus, the term "4:4:4 chroma format" as used herein may refer to either a YUV color space or an RGB color space wherein the number of samples is equal for all color components.

Figure 2A:
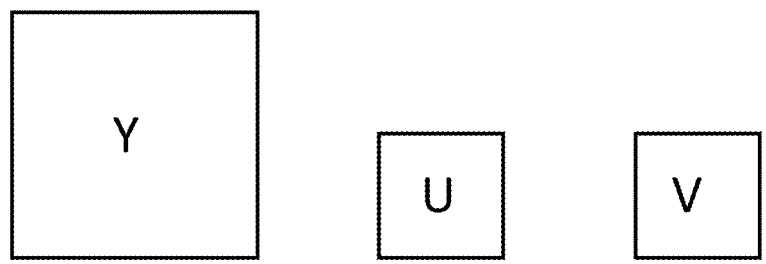
FIGS. 2A-2C are conceptual diagrams illustrating different sample formats for video data.
Figure 2B:
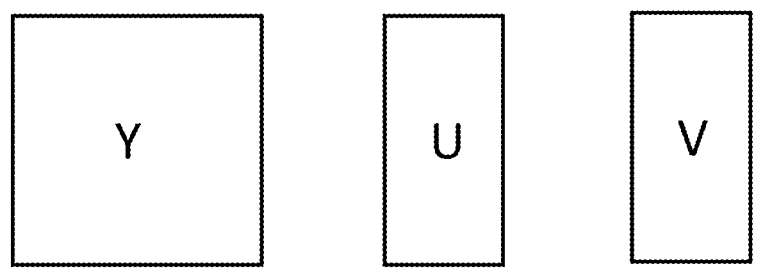
Figure 2C:
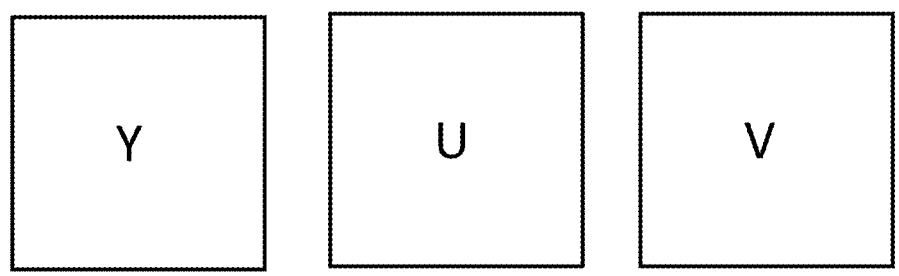

FIGS. 2A-2C are conceptual diagrams illustrating different sample formats for video data. FIG. 2A is a conceptual diagram illustrating the 4:2:0 sample format. As illustrated in FIG. 2A, for the 4:2:0 sample format, the chroma components are one quarter of the size of the luma component. Thus, for a CU formatted according to the 4:2:0 sample format, there are four luma samples for every sample of a chroma component. FIG. 2B is a conceptual diagram illustrating the 4:2:2 sample format. As illustrated in FIG. 2B, for the 4:2:2 sample format, the chroma components are one half of the size of the luma component. Thus, for a CU formatted according to the 4:2:2 sample format, there are two luma samples for every sample of a chroma component. FIG. 2C is a conceptual diagram illustrating the 4:4:4 sample format. As illustrated in FIG. 2C, for the 4:4:4 sample format, the chroma components are the same size of the luma component. Thus, for a CU formatted according to the 4:4:4 sample format, there is one luma sample for every sample of a chroma component.

Figure 3:
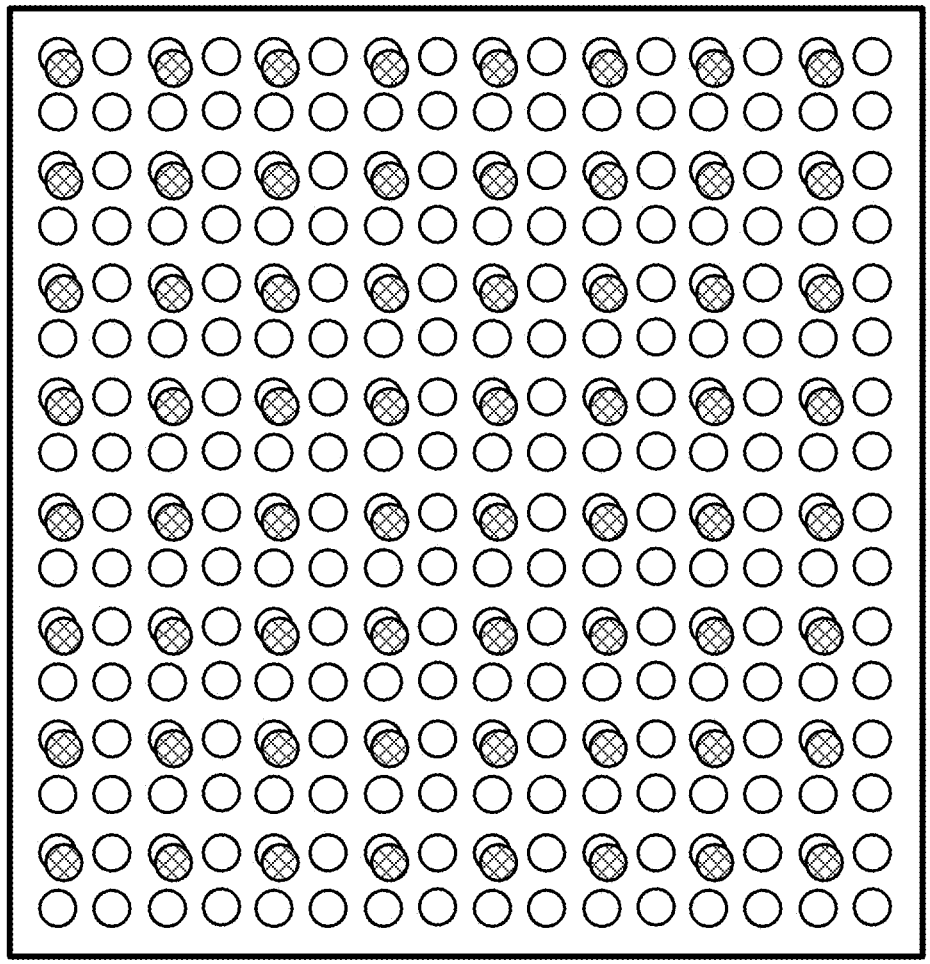
FIG. 3 is a conceptual diagram illustrating a 16×16 coding unit formatted according to a 4:2:0 sample format.

FIG. 3 is a conceptual diagram illustrating an example of a 16×16 coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, as described above, a CU may be partitioned into smaller CUs. For example, the CU illustrated in FIG. 3 may be partitioned into four 8×8 CUs, where each 8×8 CU includes 8×8 samples for the luma component and 4×4 samples for each chroma component.

Figure 4:
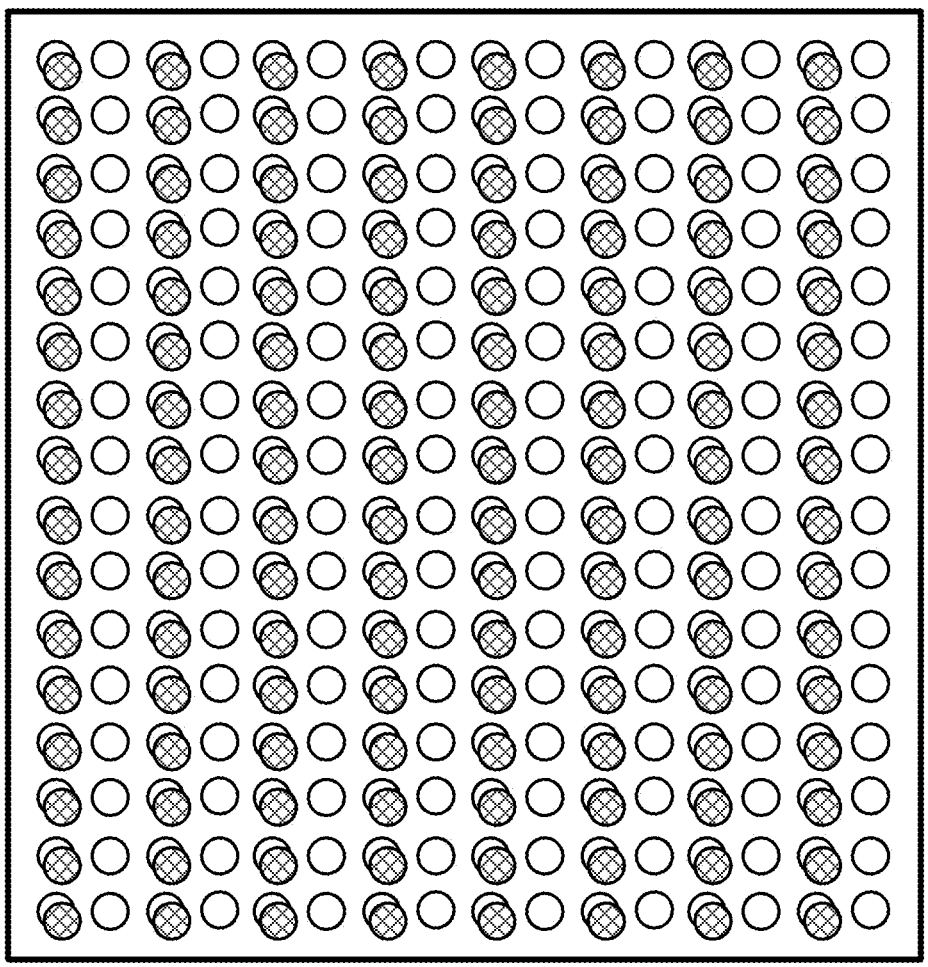
FIG. 4 is a conceptual diagram illustrating a 16×16 coding unit formatted according to a 4:2:2 sample format.

FIG. 4 is a conceptual diagram illustrating an example of a 16×16 coding unit formatted according to a 4:2:2 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:2 sample format includes 16×16 samples of luma components and 8×16 samples for each chroma component. Further, as described above, a CU may be partitioned into smaller CUs. For example, the CU illustrated in FIG. 4 may be partitioned into four 8×8 CUs, where each CU includes 8×8 samples for the luma component and 4×8 samples for each chroma component.

Figure 5:
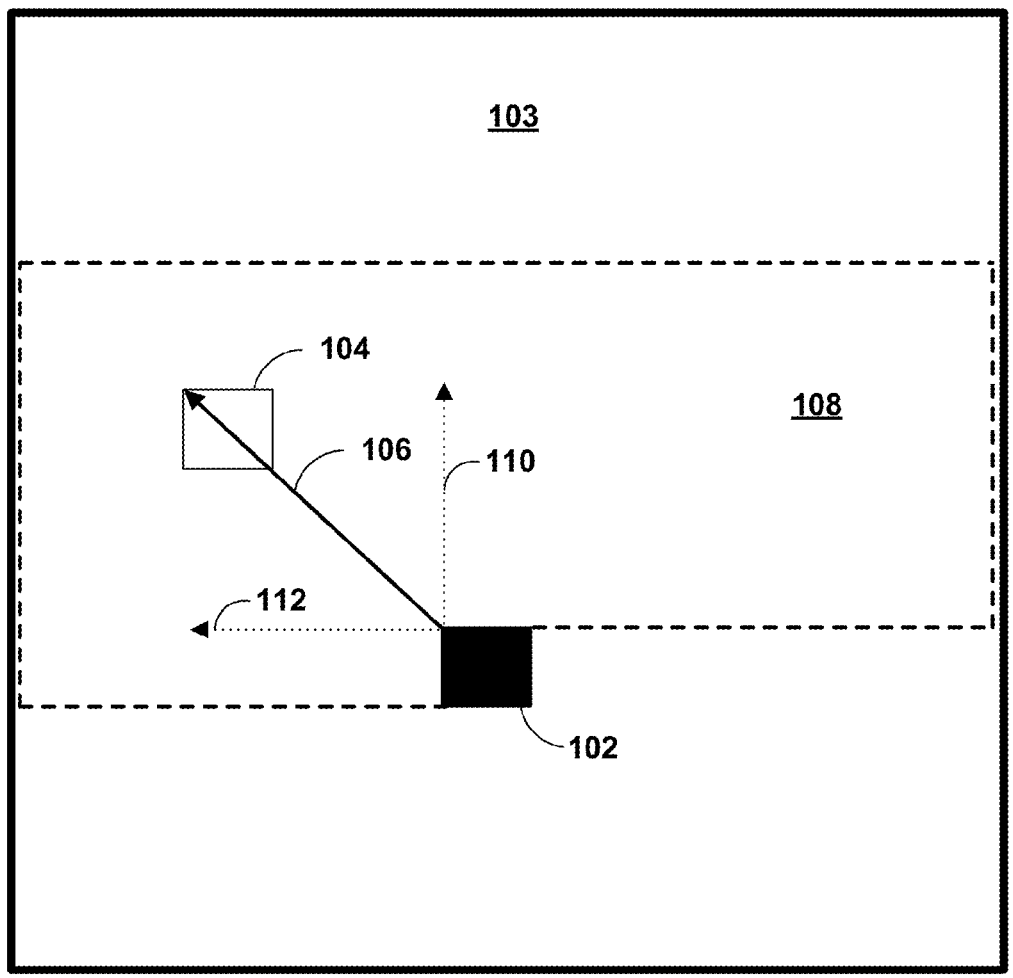
FIG. 5 shows a conceptual illustration of the intra block copy (IBC) mode.

FIG. 5 shows a conceptual illustration of the IBC mode. Video encoder 20 and video decoder 30 may, for example be configured to encode and decode blocks of video data using an IBC mode. Many applications, such as remote desktop, remote gaming, wireless displays, automotive infotainment, cloud computing, etc., are becoming routine in people's daily lives, and the coding efficiency when coding such content may be improved by the use of an IBC mode. System 10 of FIG. 1 may represent devices configured to execute any of these applications. Video content in these applications are often combinations of natural content, text, artificial graphics, etc. In text and artificial graphics regions of video frames, repeated patterns (such as characters, icons, symbols, etc.) often exist. As introduced above, IBC is a dedicated technique which enables removing this kind of redundancy and potentially improving the intra-frame coding efficiency as reported in JCT-VC M0350. As illustrated in FIG. 5, for the CUs which use IBC, the prediction signals are obtained from the already reconstructed region in the same frame (e.g., picture). In the end, the offset or block vector, which indicates the position of the prediction signal displaced from the current CU, together with the residue signal are encoded.

For instance, FIG. 5 illustrates an example technique for predicting a current block 102 of video data within a current picture 103 according to an IBC mode in accordance with the techniques of this disclosure. FIG. 5 illustrates a predictive video block 104 within current picture 103. A video coder, e.g., video encoder 20 and/or video decoder 30, may use predictive video block 104 to predict current video block 102 according to an IBC mode in accordance with the techniques of this disclosure.

Video encoder 20 selects predictive video block 104 for predicting current video block 102 from a set of previously reconstructed blocks of video data. Video encoder 20 reconstructs blocks of video data by inverse quantizing and inverse transforming the video data that is also included in the encoded video bitstream, and summing the resulting residual blocks with the predictive blocks used to predict the reconstructed blocks of video data. In the example of FIG. 5, intended region 108 within picture 103, which may also be referred to as an "intended area" or "raster area," includes the set of previously reconstructed video blocks. Video encoder 20 may define intended region 108 within picture 103 in variety of ways, as described in greater detail below. Video encoder 20 may select predictive video block 104 to predict current video block 102 from among the video blocks in intended region 108 based on an analysis of the relative efficiency and accuracy of predicting and coding current video block 102 based on various video blocks within intended region 108.

Intended region 108 may also be referred to in this disclosure as an IBC prediction region. This disclosure describes various techniques that may modify what blocks are included in intended region 108. Thus, when implementing the techniques of this disclosure, the size and shape of intended region 108 may be different than that shown in the example of FIG. 5.

Video encoder 20 determines two-dimensional vector 106 representing the location or displacement of predictive video block 104 relative to current video block 102. Two-dimensional vector 106, which is an example of an offset vector, includes horizontal displacement component 112 and vertical displacement component 110, which respectively represent the horizontal and vertical displacement of predictive video block 104 relative to current video block 102. Video encoder 20 may include one or more syntax elements that identify or define two-dimensional vector 106, e.g., that define horizontal displacement component 112 and vertical displacement component 110, in the encoded video bitstream. Video decoder 30 may decode the one or more syntax elements to determine two-dimensional vector 106, and use the determined vector to identify predictive video block 104 for current video block 102.

In some examples, the resolution of two-dimensional vector 106 can be integer pixel, e.g., be constrained to have integer pixel resolution. In such examples, the resolution of horizontal displacement component 112 and vertical displacement component 110 will be integer pixel. In such examples, video encoder 20 and video decoder 30 need not interpolate pixel values of predictive video block 104 to determine the predictor for current video block 102.

In other examples, the resolution of one or both of horizontal displacement component 112 and vertical displacement component 110 can be sub-pixel. For example, one of components 112 and 110 may have integer pixel resolution, while the other has sub-pixel resolution. In some examples, the resolution of both of horizontal displacement component 112 and vertical displacement component 110 can be sub-pixel, but horizontal displacement component 112 and vertical displacement component 110 may have different resolutions.

In some examples, a video coder, e.g., video encoder 20 and/or video decoder 30, adapts the resolution of horizontal displacement component 112 and vertical displacement component 110 based on a specific level, e.g., block-level, slice-level, or picture-level adaptation. For example, video encoder 20 may signal a flag at the slice level, e.g., in a slice header, that indicates whether the resolution of horizontal displacement component 112 and vertical displacement component 110 is integer pixel resolution or is not integer pixel resolution. If the flag indicates that the resolution of horizontal displacement component 112 and vertical displacement component 110 is not integer pixel resolution, video decoder 30 may infer that the resolution is sub-pixel resolution. In some examples, one or more syntax elements, which are not necessarily a flag, may be transmitted for each slice or other unit of video data to indicate the collective or individual resolutions of horizontal displacement component 112 and/or vertical displacement component 110.

In still other examples, instead of a flag or a syntax element, video encoder 20 may set based on, and video decoder 30 may infer the resolution of horizontal displacement component 112 and/or vertical displacement component 110 from resolution context information. Resolution context information may include, as examples, the color space (e.g., YUV, RGB, or the like), the specific color format (e.g., 4:4:4, 4:2:2, 4:2:0, or the like), the frame size, the frame rate, or the quantization parameter (QP) for the picture or sequence of pictures that include current video block 102. In at least some examples, a video coder may determine the resolution of horizontal displacement component 112 and/or vertical displacement component 110 based on information related to previously coded frames or pictures. In this manner, the resolution of horizontal displacement component 112 and the resolution for vertical displacement component 110 may be pre-defined, signaled, may be inferred from other, side information (e.g., resolution context information), or may be based on already coded frames.

Current video block 102 may be a CU, or a PU of a CU. In some examples, a video coder, e.g., video encoder 20 and/or video decoder 30, may split a CU that is predicted according to IBC into a number of PUs. In such examples, the video coder may determine a respective (e.g., different) two-dimensional vector 106 for each of the PUs of the CU. For example, a video coder may split a 2N×2N CU into two 2N×N PUs, two N×2N PUs, or four N×N PUs. As other examples, a video coder may split a 2N×2N CU into ((N/2)×N+(3N/2)×N) PUs, ((3N/2)×N+(N/2)×N) PUs, (N×(N/2)+N×(3N/2)) PUs, (N×(3N/2)+N×(N/2)) PUs, four (N/2)×2N PUs, or four 2N×(N/2) PUs. In some examples, video coder may predict a 2N×2N CU using a 2N×2N PU.

Current video block 102 includes a luma video block (e.g., luma component) and a chroma video block (e.g., chroma component) corresponding to the luma video block. In some examples, video encoder 20 may only encode one or more syntax elements defining two-dimensional vectors 106 for luma video blocks into the encoded video bitstream. In such examples, video decoder 30 may derive two-dimensional vectors 106 for each of one or more chroma blocks corresponding to a luma block based on the two-dimensional vector signaled for the luma block. In the techniques described in this disclosure, in the derivation of the two-dimensional vectors for the one or more chroma blocks, video decoder 30 may modify the two-dimensional vector for the luma block if the two-dimensional vector for the luma block points to a sub-pixel position within the chroma sample.

Depending on the color format, e.g., color sampling format or chroma sampling format, a video coder may downsample corresponding chroma video blocks relative to the luma video block. Color format 4:4:4 does not include downsampling, meaning that the chroma blocks include the same number of samples in the horizontal and vertical directions as the luma block. Color format 4:2:2 is down-sampled in the horizontal direction, meaning that there are half as many samples in the horizontal direction in the chroma blocks relative to the luma block. Color format 4:2:0 is downsampled in the horizontal and vertical directions, meaning that there are half as many samples in the horizontal and vertical directions in the chroma blocks relative to the luma block.

In examples in which video coders determine vectors 106 for chroma video blocks based on vectors 106 for corresponding luma blocks, the video coders may need to modify the luma vector. For example, if a luma vector 106 has integer resolution with horizontal displacement component 112 and/or vertical displacement component 110 being an odd number of pixels, and the color format is 4:2:2 or 4:2:0, the converted luma vector may not point an integer pixel location in the corresponding chroma block. In such examples, video coders may scale the luma vector for use as a chroma vector to predict a corresponding chroma block.

As described, FIG. 5 shows a current CU that is being coded in an IBC mode. A predictive block for the current CU may be obtained from the search region. The search region includes already coded blocks from the same frame as the current CU. Assuming, for example, the frame is being coded in a raster scan order (i.e. left-to-right and top-to-bottom), the already coded blocks of the frame correspond to blocks that are to the left of and above the current CU, as shown in FIG. 5. In some examples, the search region may include all of the already coded blocks in the frame, while in other examples, the search region may include fewer than all of the already coded blocks. The offset vector in FIG. 5, sometimes referred to as a motion vector or prediction vector, identifies the differences between a top-left pixel of the current CU and a top-left pixel of the predictive block (labeled prediction signal in FIG. 5). Thus, by signaling the offset vector in the encoded video bitstream, a video decoder can identify the predictive block for the current CU, when the current CU is coded in an IBC mode.

IBC has been included in various implementations of SCC, including the SCC extension to HEVC. An example of IBC is described above with respect to FIG. 5, where the current CU/PU is predicted from an already decoded block of the current picture/slice. In IBC, a predictive block (e.g. predictive video block 104 in FIG. 5) may be a reconstructed block that has not been loop filtered, e.g. has not been deblock filtered or SAO filtered.

For the luma component or the chroma components that are coded with IBC, the block compensation is done with integer block compensation, therefore no interpolation is needed. Therefore, the block vector is predicted and signalled at an integer level precision.

In current implementations of SCC, the block vector predictor is set to (−w, 0) at the beginning of each CTB, where w corresponds to the width of the CU. Such a block vector predictor is updated to be the one of the latest coded CU/PU if that is coded with IBC mode. If a CU/PU is not coded with IBC, then the block vector predictor remains unchanged. After block vector prediction, the block vector difference is encoded using a MV difference (MVD) coding method such as in HEVC.

Current implementations of IBC enable IBC coding at both CU and PU levels. For PU level IBC, 2N×N and N×2N PU partitions are supported for all the CU sizes. In addition, when the CU is the smallest CU, N×N PU partition is supported.

As introduced above, HEVC contains several proposals to make the codec more parallel-friendly, including tiles and wavefront parallel processing (WPP). HEVC defines tiles as an integer number of coding tree blocks co-occurring in one column and one row, ordered consecutively in coding tree block raster scan of the tile. The division of each picture into tiles is a partitioning.

Figure 6:
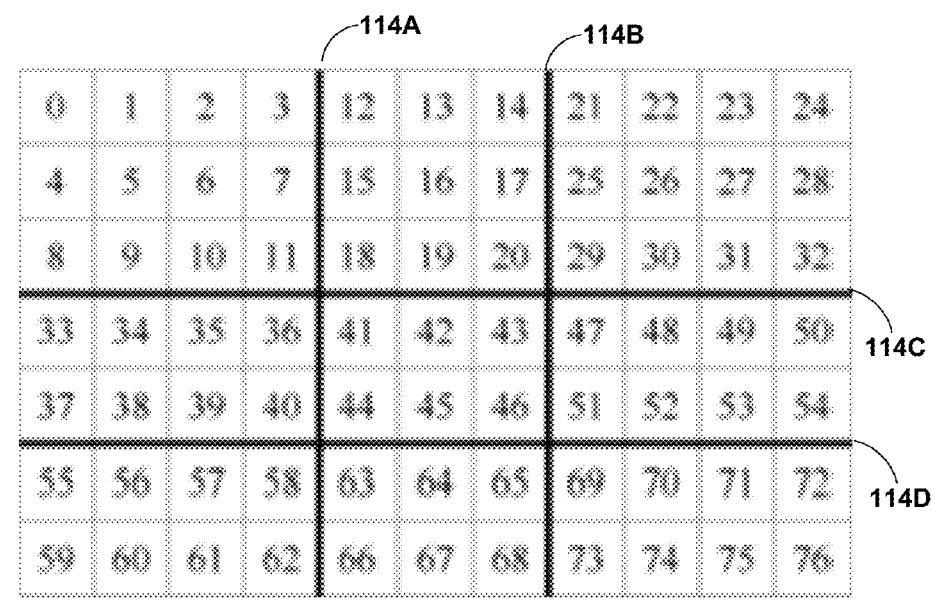

FIG. 6 shows a raster scan of a picture when tiles are used. Tiles in a picture are ordered consecutively in tile raster scan of the picture as shown in FIG. 6. The number of tiles and the location of their boundaries can be defined for the entire sequence or changed from picture to picture. Tile boundaries, similar to slice boundaries, break parse and prediction dependencies so that a tile can be processed independently. In-loop filters (de-blocking and SAO), however, may still cross tile boundaries. HEVC also specifies some constraints on the relationship between slices and tiles. In the example of FIG. 6, lines 114A and 114B represent vertical tile boundaries, and lines 114C and 114D represent horizontal tile boundaries. The numbers within each tile represent the raster scan order for the CTBs within the tile. For example, for the upper left most tile, the block labeled 0 is first decoded, then the block labeled 1, then the block labeled 2, and so on.

A potential advantage of using tiles is that that tiles do not always require communication between processors of a video decoder, such as video decoder 30, for entropy decoding and motion compensation reconstruction. Such communication may, however, be needed if the syntax element loop_filter_across_tiles_enabled_flag is set to 1. Compared to slices, tiles potentially have better coding efficiency because tiles allow picture partition shapes that contain samples with a potential higher correlation than slices, and also because tiles potentially reduce slice header overhead.

The tile design in HEVC may provide several benefits. As one example, tiles may enable parallel processing by video decoder 30. As another example, tiles may improve coding efficiency by allowing a changed decoding order of CTUs compared to the use of slices, while the main benefit is the first one. When a tile is used in single-layer coding, the syntax element min_spatial_segmentation_idc may be used by a decoder to calculate the maximum number of luma samples to be processed by one processing thread, making the assumption that the decoder maximally utilizes the parallel decoding information. In HEVC there may be same picture inter-dependencies between the different threads—e.g. due to entropy coding synchronization or de-blocking filtering across tile or slice boundaries. HEVC includes a note which encourages encoders to set the value of min_spatial_segmentation_idc to be the highest possible value.

As introduced above, HEVC also supports WPP. When WPP is enabled, each CTU row of a picture is a separated partition. Compared to slices and tiles, however, with WPP no coding dependences are broken at CTU row boundaries. Additionally, CABAC probabilities are propagated from the second CTU of the previous row, to further reduce the coding losses. Also, WPP does not change the regular raster scan order. As dependencies are not broken, the rate-distortion loss of a WPP bitstream may be small compared to that of a nonparallel bitstream.

When WPP is enabled, a number of processors up to the number of CTU rows can work in parallel to process the CTU row (or lines). The wavefront dependences, however, do not allow all the CTU rows to start decoding at the beginning of the picture. Consequently, the CTU rows also cannot finish decoding at the same time at the end of the picture. This introduces parallelization inefficiencies that become more evident when a high number of processors are used.

Figure 7:
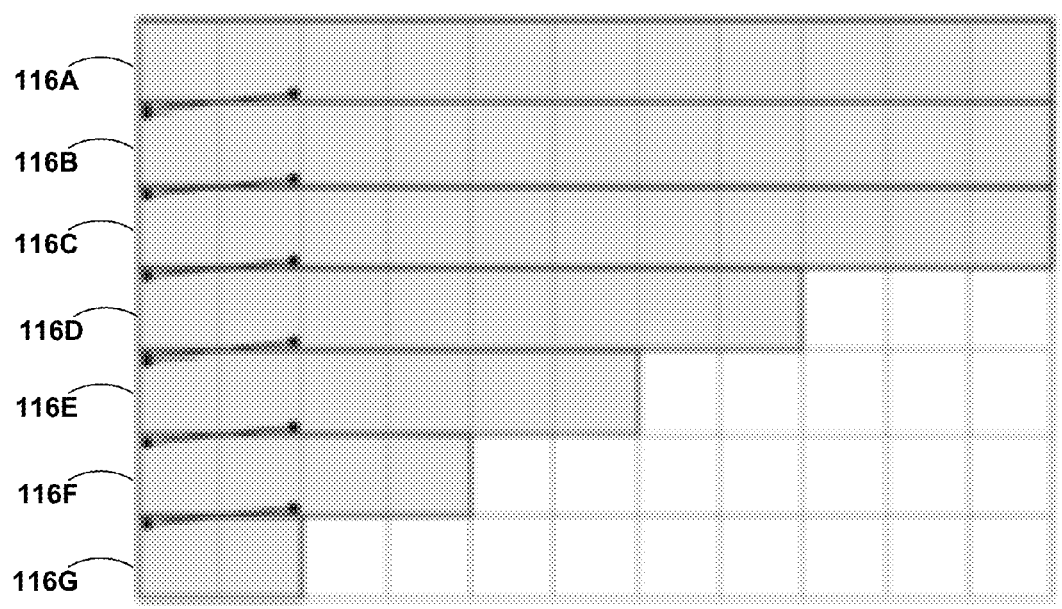
FIG. 7 shows an example of WPP processes rows of CTBs in parallel, each row starting with the CABAC probabilities available after processing the second CTB of the row above.

FIG. 7 shows an example of WPP processes rows of CTBs in parallel, each row starting with the CABAC probabilities available after processing the second CTB of the row above. Each of rows 116A-116G may be decoded in parallel, but as each row potentially depends on information of the row above, the decoding of all the rows may not be able to begin at the same time. For example, video decoder 30 cannot start decoding row 116D until a certain number of blocks of row 116C have been decoded. Similarly, video decoder 30 cannot start decoding 116E until a certain number of blocks of row 116D have already been decoded. As will be explained in more detail below, the amount of time video decoder 30 waits before decoding a row after starting to decode the row above may be referred to as a delay. In the example, of FIG. 7, the grey blocks represent already decoded blocks, while the white blocks represent yet to be decoded blocks. As can be seen in FIG. 7, a row typically has more already decoded blocks than the row immediately below.

Coding video data in IBC mode in conjunction with parallel processing techniques such as tiles and WPP may pose potential difficulties. IBC mode uses previously decoded unfiltered samples within the same picture for prediction. In the current test model, for the IBC mode the search range is unrestricted and can use any unfiltered decoded samples of the current picture (full search IBC). In real-time applications it is typical to process in non-raster order (e.g WPP) to enabled processing multiple CTU at a same time. HEVC defines the entropy decoding order when WPP or entropy_coding_sync_enabled_flag is enabled.

Certain implementations of SCC with WPP and tiles potentially have some problems when a non-raster scan is enabled. As a first example, the availability of prediction samples is always considered based on the raster order sequential processing. This potentially significantly impacts the parallel processing capabilities of the system. As a second example, there have been some proposals in the recent JCT-VC meetings to restrict the IBC prediction region in the similar lines to entropy parsing when WPP is enabled. However, this potentially has a significant impact on the coding efficiency due to a limited search range being available for IBC mode.

In order to allow WPP like parallel processing schemes and reduce the coding efficiency loss this disclosure describes techniques to add some flexible restrictions on the IBC search range and/or on IBC block vectors.

Each of the following techniques may be applied separately or jointly. The techniques described in this disclosure detail the availability of prediction region for IBC prediction. In addition this region may depend based on WPP is enabled or not.

According to a first technique, a fixed processing order of reconstructing the samples may be considered. (e.g entropy parsing order when WPP is enabled or any of the below processing order). The samples that are already decoded/reconstructed may be only used for prediction.

According to a second technique, a fixed processing order of reconstructing the samples may be considered. (e.g entropy parsing order when WPP is enabled or any of the below processing order). The samples that are already decoded/reconstructed may be only used for prediction. Further any region below the current CTB is considered as not available for IBC prediction.

According to a third technique, a fixed processing order of reconstructing the samples may be considered. (e.g entropy parsing order when WPP is enabled or any of the below processing order) and any region below the current CTB is considered as not available for IBC prediction and partial regions are considered as not available for the above the current CTB based on the max TU size specified in the SPS header.

According to a fourth technique, a fixed processing order of reconstructing the samples may be considered. (e.g entropy parsing order when WPP is enabled or any of the below processing order) and partial regions are considered as not available for the above the current CTB based on the max TU size specified in the SPS header.

According to a fifth technique, a flexible processing order of reconstructing the samples may be considered to be valid for IBC prediction and this regions are signalled in the bitstream.

According to a sixth technique, a flexible processing order of reconstructing the samples may be considered to be valid for IBC prediction and this regions are signalled in the bitstream and any region below the current CTB is considered as no available for IBC prediction. Examples of the various techniques introduced above will now be illustrated in more detail.

FIGS. 8-12 show examples of blocks configured to be decoded using WPP. Each of the regions shown in FIGS. 8-12 corresponds to a CTB. In the examples of FIGS. 8-12, the CTB labeled with an X represents a current block being decoded. For IBC prediction, blocks labeled with 1 may be used for IBC, while blocks labeled with 0 may not be used for IBC.

Figure 8:
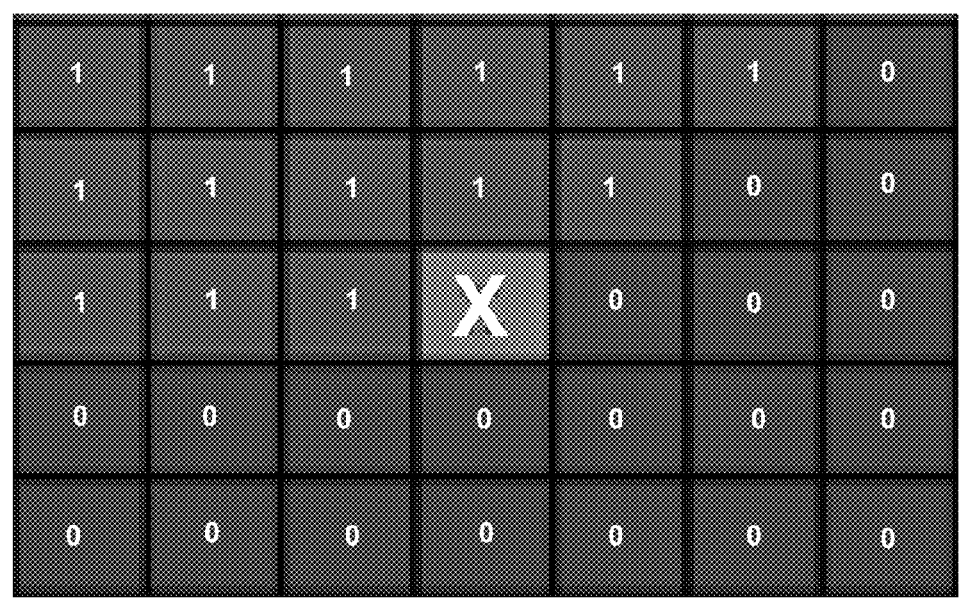

FIG. 8 shows a first example with an IBC processing order with a 1 CTB delay with regard to the above CTB row will now be described. The following restriction as shown in FIG. 8 is applied on the IBC block vectors, such that no IBC block predicts from region marked with 0's. In FIG. 8, the region marked with "1's" is a valid predicted region that has already been reconstructed. These restrictions would allow processing of any "0" marked region in parallel with current block x.

8.4.4 Derivation Process for Block Vector Components in Intra Block Copying Prediction Mode It is a requirement of bitstream conformance that $$(xPb+bv\text{Intra}[xPb][yPb][0]+nPbSw-1)/\text{CtbSize}Y-x\text{Curr}/\text{CtbSize}Y<=y\text{Curr}/\text{CtbSize}Y-(yPb+bv\text{Intra}[xPb][yPb][1]+nPbSh-1)/\text{CtbSize}Y$$

and $$y\text{Curr}/\text{CtbSize}Y-(yPb+bv\text{Intra}[xPb][yPb][1]+nPbSh-1)/\text{CtbSize}Y>=0$$

According to one technique of this disclosure, for one or more blocks coded with wavefront parallel processing enabled, video decoder 30 may determine a CTB delay that identifies a delay between when a first row of CTBs starts being decoded and when a second row of CTBs below the first row of CTBs starts being decoded. For a current block of video data coded in an IBC mode and coded with wavefront parallel processing disabled, video decoder 30 may determine an IBC prediction region for the current block within a picture that includes the current block based on the CTB delay that was determined for the one or more blocks coded with WPP enabled. In other words, video decoder 30 may determine the IBC prediction region for the current block based on the CTB delay regardless of the value of the entropy_coding_sync_enabled_flag, which means regardless of whether or not WPP is enabled or disabled. By always determining the IBC prediction region based on the CTB delay, overall decoding complexity is reduced, but reduced in a way that still enables video decoder 30 to support IBC mode with WPP enabled.

In some alternative implementations, the above restriction may only be applied on the IBC block vectors when entropy_coding_sync_enabled_flag is equal to 1 such that no IBC block predicts from non-decoded region.

8.4.4 Derivation Process for Block Vector Components in Intra Block Copying Prediction Mode It is a requirement of bitstream conformance that when entropy_coding_sync_enabled_flag is equal to 1

$$y\text{Curr}/\text{CtbSize}Y-(yPb+bv\text{Intra}[xPb][yPb][1]+nPbSh-1)/\text{CtbSize}Y>=0$$

and when entropy_coding_sync_enabled_flag is equal to 1

$$(xPb+bv\text{Intra}[xPb][yPb][0]+nPbSw-1)/\text{CtbSize}Y-x\text{Curr}/\text{CtbSize}Y<=y\text{Curr}/\text{CtbSize}Y-(yPb+bv\text{Intra}[xPb][yPb][1]+nPbSh-1)/\text{CtbSize}Y$$

Figure 9:
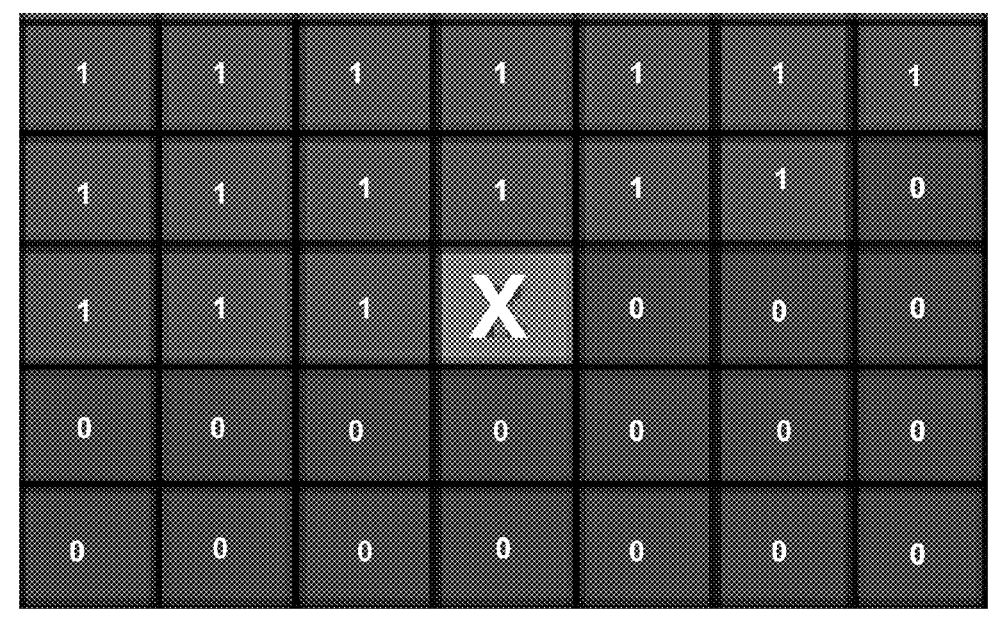

A second example with IBC processing order with 2 CTB delay with regard to the above CTB row will now be described. The following restriction as shown in FIG. 9 is applied on the IBC block vectors, such that no IBC block predicts from the "0" region. In FIG. 9, the region marked with 1's is a valid predicted region that has already been reconstructed. These restrictions would allow processing of any "0" marked region in parallel with current block x. Here each region corresponds to CTB.

8.4.4 Derivation Process for Block Vector Components in Intra Block Copying Prediction Mode It is a requirement of bitstream conformance that $$(xPb+bv\text{Intra}[xPb][yPb][0]+nPbSw-1)/\text{CtbSize}Y-x\text{Curr}/\text{CtbSize}Y<=2*(y\text{Curr}/\text{CtbSize}Y-(yPb+bv\text{Intra}[xPb][yPb][1]+nPbSh-1)/\text{CtbSize}Y)$$

and $$y\text{Curr}/\text{CtbSize}Y-(yPb+bv\text{Intra}[xPb][yPb][1]+nPbSh-1)/\text{CtbSize}Y>=0$$

Alternatively the above restriction conditions are applied on the IBC block vectors only when entropy_coding_sync_enabled_flag is equal to 1 such that no IBC block predicts from non-decoded region.

8.4.4 Derivation Process for Block Vector Components in Intra Block Copying Prediction Mode It is a requirement of bitstream conformance that when entropy_coding_sync_enabled_flag is equal to 1

$$y\text{Curr}/\text{CtbSize}Y-(yPb+bv\text{Intra}[xPb][yPb][1]+nPbSh-1)/\text{CtbSize}Y>=0$$

and when entropy_coding_sync_enabled_flag is equal to 1

$$(xPb+bv\text{Intra}[xPb][yPb][0]+nPbSw-1)/\text{CtbSize}Y-x\text{Curr}/\text{CtbSize}Y<=2*(y\text{Curr}/\text{CtbSize}Y-(yPb+bv\text{Intra}[xPb][yPb][1]+nPbSh-1)/\text{CtbSize}Y)$$

Figure 10:
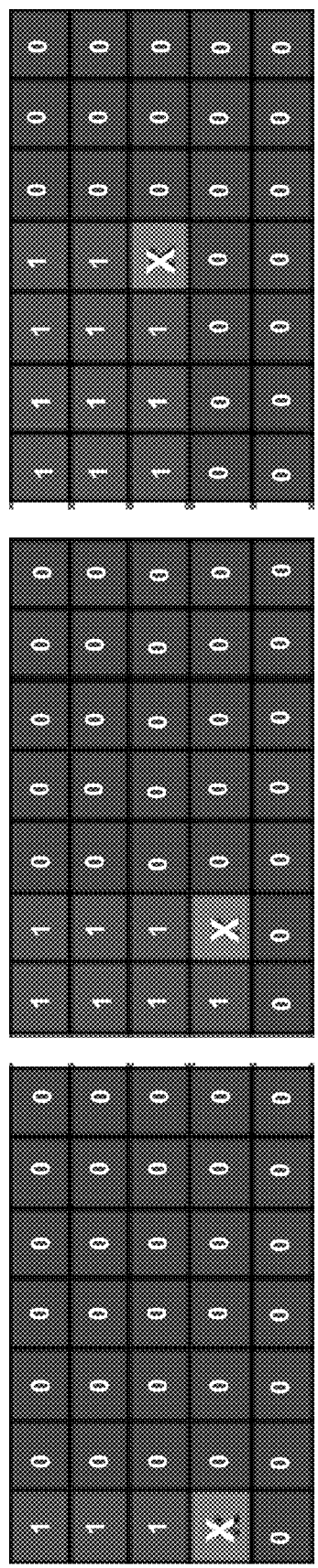

A third example with IBC processing order with tile shaped regions will now be described. The following restriction as shown in FIG. 10 is applied on the IBC block vectors, such that no IBC block predicts from the "0" region. In FIG. 10, the region marked with 1's is a valid predicted region that has already been reconstructed. These restrictions would allow processing of any "0" marked region in parallel with current block x. Here each region corresponds to CTB.

In one example, the above restriction is applied only when entropy_coding_sync_enabled_flag is equal to 1 as below 8.4.4 Derivation Process for Block Vector Components in Intra Block Copying Prediction Mode It is a requirement of bitstream conformance that $$x\text{Curr}/\text{CtbSize}Y-(xPb+bv\text{Intra}[xPb][yPb][0]+nPbSw-1)/\text{CtbSize}Y>=0$$

$$y\text{Curr}/\text{CtbSize}Y-(yPb+bv\text{Intra}[xPb][yPb][1]+nPbSh-1)/\text{CtbSize}Y>=0$$

Alternatively the above restriction conditions are applied on the IBC block vectors only when entropy_coding_sync_enabled_flag is equal to 1 such that no IBC block predicts from non-decoded region.

It is a requirement of bitstream conformance that when entropy_coding_sync_enabled_flag is equal to 1

$$xCurr/CtbSizeY-(xPb+bvIntra[xPb][yPb][0]+nPbSw-1)/CtbSizeY>=0$$

$$yCurr/CtbSizeY-(yPb+bvIntra[xPb][yPb][1]+nPbSh-1)/CtbSizeY>=0$$

A fourth example with IBC processing order with less than 1 CTB delay with regard to the above CTB row will now be described. In this example it is proposed to restrict prediction samples for IBC similar to "IBC processing order with 1 CTB delay with regard to the above CTB row" discussed above but with the delay of the maximum TU block instead, which is less than 1 CTB delay. Let the maximum TU size maxTUSizeY is derived as maxTUSizeY=1<<MaxTbLog2SizeY. (signalled in SPS).

8.4.4 Derivation Process for Block Vector Components in Intra Block Copying Prediction Mode It is a requirement of bitstream conformance that $$(xPb+bvIntra[xPb][yPb][0]+nPbSw-1)/maxTUSizeY-xCurr/maxTUSizeY<=yCurr/maxTUSizeY-(yPb+bvIntra[xPb][yPb][1]+nPbSh-1)/maxTUSizeY$$

and $$yCurr/maxTUSizeY-(yPb+bvIntra[xPb][yPb][1]+nPbSh-1)/maxTUSizeY>=0$$

Alternatively the above restriction conditions are applied on the IBC block vectors only when entropy_coding_sync_enabled_flag is equal to 1 such that no IBC block predicts from non-decoded region.

8.4.4 Derivation Process for Block Vector Components in Intra Block Copying Prediction Mode It is a requirement of bitstream conformance that when entropy_coding_sync_enabled_flag is equal to 1

$$yCurr/maxTUSizeY-(yPb+bvIntra[xPb][yPb][1]+nPbSh-1)/maxTUSizeY>=0$$

and when entropy_coding_sync_enabled_flag is equal to 1

$$(xPb+bvIntra[xPb][yPb][0]+nPbSw-1)/maxTUSizeY-xCurr/maxTUSizeY<=yCurr/maxTUSizeY-(yPb+bvIntra[xPb][yPb][1]+nPbSh-1)/maxTUSizeY$$

Wavefront parallel processing enables to parallel process each CTB row in the picture. For example, in a 1080p picture, up to 17 CTB rows can be processed in parallel if the system has 17 parallel processing cores. However, in most multi-core systems, it is typical that only limited number of parallel processing cores are used (e.g 4). In this scenario, only 4 CTB rows are processed in parallel and $5^{th}$ CTB row is processed after completion of one of above 4 CTB rows. In such a scenario, it is possible for the $5^{th}$ CTB row to predict from the regions that are already decoded from the previous 4 CTB rows. In this example it is proposed to signal for each CTB row, the valid decoded region (CTB's) for all its previous decoded CTB rows. In another embodiment it is proposed to signal for each CTB row, the valid decoded region (CTB's) for all its CTB rows. This information can be signalled in SPS, VPS, PPS, slice header or their respective extension. Alternatively this information can be signalled in SEI message.

In one example, the below information is signalled conditionally based on when entropy_coding_sync_enabled_flag is equal to 1. Alternatively below information is signaled independent of whether entropy_coding_sync_enabled_flag is enabled or not.

In another example, the below information is signalled conditionally on IBC tool enabling flag which can be signaled in at least one parameter set (PPS, SPS, VPS) or its extension.

In a first example, for each CTB row, the availability regions for IBC prediction for all of its above CTB's rows are signalled. See for example FIG. 11. The regions below the current CTB are considered unavailable for IBC prediction. Below is an example implementation of the proposed method at slice header.

|  | Descriptor |
|---|---|
| pps_scc_extension ( ) { | |
| ... | |
|     if(intra_block_copy_enabled_flag){ | |
|         pps_ibc_ref_avail_signal_present_flag | |
|     } | |
| ... | |
| } | |

|  | Descriptor |
|---|---|
| slice_segment_header( ) { | |
|   first_slice_segment_in_pic_flag | u(1) |
|   if( tiles_enabled_flag \|\| | |
|   entropy_coding_sync_enabled_flag ) { | |
|     num_entry_point_offsets | ue(v) |
|     if( num_entry_point_offsets > 0 ) { | |
|       offset_len_minus1 | ue(v) |
|       for( i = 0; i < num_entry_point_offsets; i++ ) | |
|         entry_point_offset_minus1[ i ] | u(v) |
|     } | |
|   } | |
|   if(pps_ibc_ref_avail_restriction_present_flag) { | |
|     num_ctbY_in_slice_minus1 | ue(v) |
|     for(i=0;i< num_ctbY_in_slice;i++) | |
|       for(j=0;j< i;i++) | |
|         max_delay_IBCPred_in_CTBs[ i ][ j ] | ue(v) |
|   } | |
|   byte_alignment( ) | |
| } | | pps_ibc_ref_avail_ restriction_present_flag equal to 1 specifies that intra block copy reference usage restrictions are present and are signaled in the slice segment header for all the coded tree blocks of the slice. pps_ibc_ref_avail_restriction_present_flag equal to 0 specifies that intra block copy reference usage info is not present in the slice segment header When pps_ibc_ref_avail_restriction_present_flag is not present, it is inferred to be 0.

num_ctbY_in_slice_minus1 plus 1 specifies the number of CTB rows in the slice.

max_delay_IBCPred_in_CTBs[i][j] specifies for the current CTB row i that maximum delay in terms of CTB's for each the previous CTB row j that is available for IBC prediction. When not present it is inferred to be equal to number of CTB in the row.

In another example implementation, for each CTB row, the availability regions for IBC prediction for all CTB's rows are signalled. See for example FIG. 12. Below is an example implementation of the proposed method at slice header.

| | Descriptor |
|---|---|
| slice_segment_header( ) { | |
|     first_slice_segment_in_pic_flag | u(1) |
|     if( tiles_enabled_flag \|\| | |
|     entropy_coding_sync_enabled_flag ) { | |
|         num_entry_point_offsets | ue(v) |
|         if( num_entry_point_offsets > 0 ) { | |
|             offset_len_minus1 | ue(v) |
|             for( i = 0; i < num_entry_point_offsets; i++ ) | |
|                 entry_point_offset_minus1[ i ] | u(v) |
|         } | |
|     } | |
|     if(pps_ibc_ref_avail_restriction_present_flag) { | |
|     num_ctbY_in_slice_minus1 | ue(v) |
|         for(i=0;i< num_ctbY_in_slice;i++) | |
|             for(j=0;j< num_ctbY_in_slice;i++) | |
|                 max_delay_IBCPred_in_CTBs[ i ][ j ] | ue(v) |
|     } | |
|     byte_alignment( ) | |
| } | | pps_ibc_ref_avail_restriction_present_flag equal to 1 specifies that intra block copy reference usage restrictions are present and are signaled in the slice segment header for all the coded tree blocks of the slice. pps_ibc_ref_avail_restriction_present_flag equal to 0 specifies that intra block copy reference usage info is not present in the slice segment header When pps_ibc_ref_avail_restriction_present_flag is not present, it is inferred to be 0.

num_ctbY_in_slice_minus1 plus 1 specifies the number of CTB rows in the slice.

max_delay_IBCPred_in_CTBs[i][j] specifies for the current CTB row i that maximum delay in terms of CTB's for each the previous CTB row j that is available for IBC prediction. When not present it is inferred to be equal to number of CTB in the row.

Alternatively, this can be signalled at SPS VUI or SEI message and combined with aspects proposed in JCTVC-S0145 and U.S. Provisional Patent Application 62/061,063 filed 7 Oct. 2014.

Another example technique of this disclosure relates to signaling of IBC mode for merge. This disclosure introduces techniques signal the usage of IBC mode for merge mode. The proposed methods are mainly concerned on screen content coding, including the support of possibly high bit depth (more than 8 bit), different chroma sampling format such as 4:4:4, 4:2:2, 4:2:0, 4:0:0 and etc.

In the recent JCT-VC meeting, there have been proposals to modify merge candidate list generation when IBC mode is used. As prediction characteristics of IBC is observed to be different from inter, it was shown to provide coding efficiency when the merge candidate list generation process is modified differently from inter.

Figure 13:
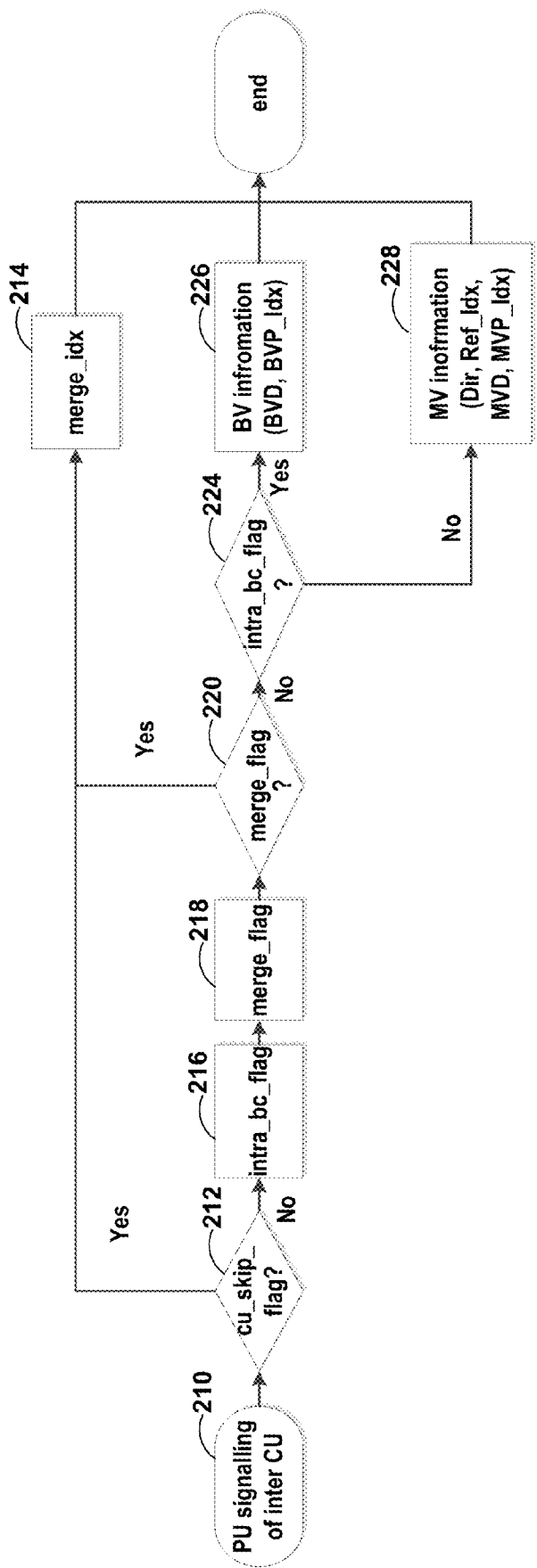
FIG. 13 shows an example method of signaling an intra_bc_flag syntax element.

FIG. 13 shows an example signaling techniques wherein the IBC merge process is signaled separately from the inter merge process. In the example of FIG. 13, video decoder 30 receives, for a PU, syntax elements indicating if a CU of the PU is coded in inter mode (210). If a cu_skip_flag for the CU is true (212, yes), then the CU is coded in a skip mode, and video decoder 30 receives, or infers, a merge index for the CU (214) and codes the CU according to the motion information associated with the determined merge index. If a cu_skip_flag for the CU is false (212, no), then video decoder 30 receives the syntax element intra_bc_flag (216) and a merge flag (218). If the merge flag is true (220, yes), then video decoder 30 receives a merge index (214) and decodes the CU according to the motion information associated with the merge index. If the merge flag is false (220, no), then video decoder 30 receives another intra_bc_flag (224). If the intra_bc_flag is true (224, yes), then video decoder 30 receives block vector information (226). Based on the received block vector information, video decoder 30 decodes the CU. If the intra_bc_flag is false (224, no), then video decoder 30 receives motion vector information (228). Based on the motion vector information, video decoder 30 decodes the CU.

The scheme of signaling described in FIG. 13 has potential problems. As one example, the signaling of intra_bc_flag for every PU to separate inter and IBC mode may not be efficient for unification of IBC and inter modes. Aspects/solutions related to this problem are covered in U.S. Provisional Patent Application 62/061,121, filed 7 Oct. 2014, U.S. patent application Ser. No. 14/876,699 filed 6 Oct. 2015, and JCTVC-S0113. It has been proposed to align coding of BVD and BVP_idx with the coding of MVD and MVP index with respect to inter prediction.

Figure 14:
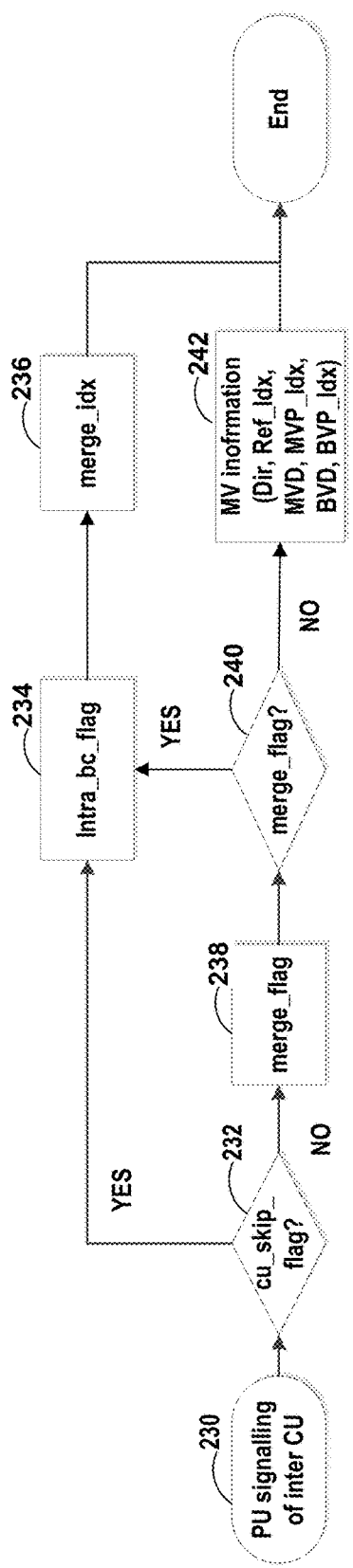
FIG. 14 shows another example method of signaling an intra_bc_flag syntax element.

According to one technique of this disclosure, it is proposed to signal intra_bc_flag only when the current PU is merge (that is merge_flag is 1) as shown in FIG. 14. Additionally, the intra_bc_flag may be signalled conditionally on IBC tool enabling flag which can be signaled in at least one parameter set (PPS, SPS, VPS) or elsewhere. This disclosure introduces techniques to separate IBC merge process from the inter merge process based on intra_bc_flag that is signaled only for merge PU. In such an instance, the merge candidate lists for IBC modes and conventional inter prediction may be different. The syntax element intra_bc_flag may not be signalled and inferred as 1 in the following cases: (1) the current slice is I-slice; (2) the current CU size is 8×8 and its partition size is N×N.

FIG. 14 shows an example signaling techniques wherein the IBC merge process is only signaled once compared to the separately signaling of FIG. 13. In the example of FIG. 14, video decoder 30 receives, for a PU, syntax elements indicating if a CU of the PU is coded in inter mode (230). If a cu_skip_flag for the CU is true (232, yes), then the CU is coded in a skip mode, and video decoder 30 receives an intra_bc_flag (234) and a merge index for the CU (214) and codes the CU according to the motion information associated with the determined merge index. If a cu_skip_flag for the CU is false (232, no), then video decoder 30 receives a merge flag (240). If the merge flag is true (240, yes), then video decoder 30 receives an intra_bc_flag (234) and a merge index (236) and decodes the CU according to the motion information associated with the merge index. If the merge flag is false (240, no), then video decoder 30 receives motion information (242), possibly include IBC block vector information, and decodes the CU according to the motion information.

Figure 15:
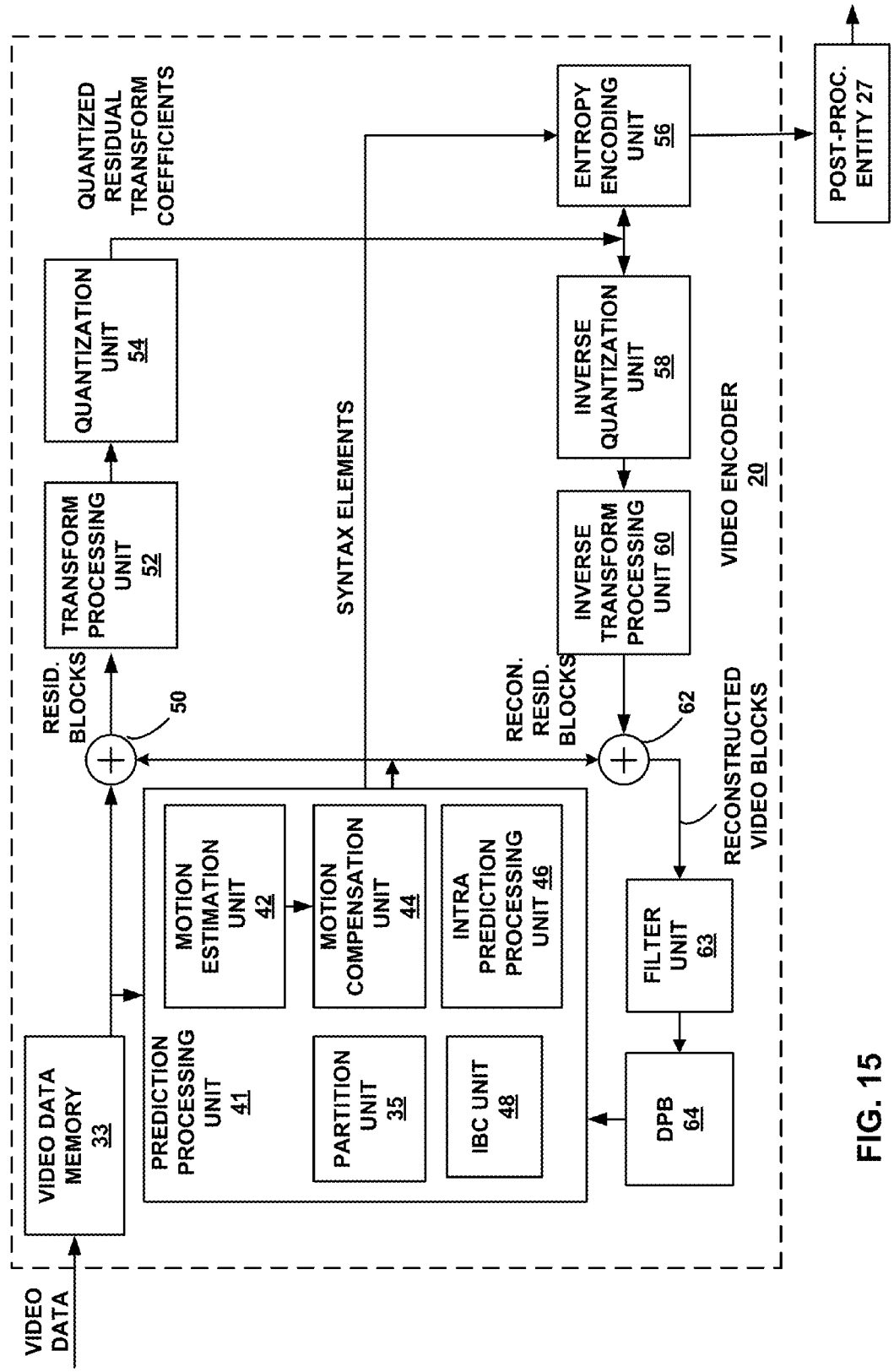
FIG. 15 is a block diagram illustrating an example video encoder that may implement the techniques described in this disclosure.

FIG. 15 is a block diagram illustrating an example video encoder 20 that may implement the techniques described in this disclosure. Video encoder 20 may be configured to output video to post-processing entity 27. Post-processing entity 27 is intended to represent an example of a video entity, such as a MANE or splicing/editing device, that may process encoded video data from video encoder 20. In some instances, post-processing entity 27 may be an example of a network entity. In some video encoding systems, post-processing entity 27 and video encoder 20 may be parts of separate devices, while in other instances, the functionality described with respect to post-processing entity 27 may be performed by the same device that comprises video encoder 20. In some example, post-processing entity 27 is an example of storage device 17 of FIG. 1

Video encoder 20 may perform intra-, inter-, and IBC coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes. IBC coding modes, as described above, may remove spatial redundancy from a frame of video data, but unlike tradition intra modes, IBC coding codes may be used to locate predictive blocks in a larger search area within the frame and refer to the predictive blocks with offset vectors, rather than relying on intra-prediction coding modes.

In the example of FIG. 15, video encoder 20 includes video data memory 33, partitioning unit 35, prediction processing unit 41, filter unit 63, decoded picture buffer 64, summer 50, transform processing unit 52, quantization unit 54, and entropy encoding unit 56. Prediction processing unit 41 includes motion estimation unit 42, motion compensation unit 44, intra-prediction processing unit 46, and IBC unit 48. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 15 as being an in loop filter, in other configurations, filter unit 63 may be implemented as a post loop filter.

In various examples, a fixed or programmable hardware unit of video encoder 20 may be tasked to perform the techniques of this disclosure. Also, in some examples, the techniques of this disclosure may be divided among one or more of the illustrated fixed or programmable hardware units of video encoder 20 shown in FIG. 15, though other devices may also perform the techniques of this disclosure. For example, consistent with the example of FIG. 15, IBC unit 48 of video encoder 20 may perform the techniques of this disclosure, alone, or in combination with other units of video encoder 20, such as motion estimation unit 42, motion compensation unit 44, intra-prediction processing unit 46, and entropy encoding unit 56. In some examples, video encoder 20 may not include IBC unit 48 and the functionality of IBC unit 48 may be performed by other components of prediction processing unit 41, such as motion estimation unit 42 and/or motion compensation unit 44.

Video data memory 33 may store video data to be encoded by the components of video encoder 20. The video data stored in video data memory 33 may be obtained, for example, from video source 18. Decoded picture buffer 64 may be a reference picture memory that stores reference video data for use in encoding video data by video encoder 20, e.g., in intra-, inter-, or IBC coding modes. Video data memory 33 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and decoded picture buffer 64 may be provided by the same memory device or separate memory devices. In various examples, video data memory 33 may be on-chip with other components of video encoder 20, or off-chip relative to those components.

As shown in FIG. 15, video encoder 20 receives video data and stores the video data in video data memory 33. Partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes, one of a plurality of inter coding modes, or one of a plurality of IBC coding modes, for the current video block based on error results (e.g., coding rate and the level of distortion). Prediction processing unit 41 may provide the resulting intra-, inter-, or IBC coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 may perform inter-predictive coding of the current video block relative to one or more predictive blocks in one or more reference pictures to provide temporal compression. Motion estimation unit 42 and motion compensation unit 44 within prediction processing unit 41 may also perform IBC coding of the current video block relative to one or more predictive blocks in the same picture to provide spatial compression.

Motion estimation unit 42 may be configured to determine the inter-prediction mode or IBC mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture. In the case of IBC coding, a motion vector, which may be referred to as an offset vector in IBC, may indicate the displacement of a PU of a video block within a current video frame or picture relative to a predictive block within the current video frame. IBC unit 48 may determine vectors, e.g., block vectors, for IBC coding in a manner similar to the determination of motion vectors by motion estimation unit 42 for inter prediction, or may utilize motion estimation unit 42 to determine the block vector.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

In some examples, IBC unit 48 may generate vectors and fetch predictive blocks in a manner similar to that described above with respect to motion estimation unit 42 and motion compensation unit 44, but with the predictive blocks being in the same picture or frame as the current block and with the vectors being referred to as block vectors as opposed to motion vectors. In other examples, IBC unit 48 may use motion estimation unit 42 and motion compensation unit 44, in whole or in part, to perform such functions for IBC prediction according to the techniques described herein. In either case, for IBC, a predictive block may be a block that is found to closely match the block to be coded, in terms of pixel difference, which may be determined by sum of absolute difference (SAD), sum of squared difference (SSD), or other difference metrics, and identification of the block may include calculation of values for sub-integer pixel positions.

Motion compensation, performed by motion compensation unit 44, may involve fetching or generating the predictive block based on the motion vector determined by motion estimation, possibly performing interpolations to sub-pixel precision. Interpolation filtering may generate additional pixel samples from known pixel samples, thus potentially increasing the number of candidate predictive blocks that may be used to code a video block. Upon receiving the motion vector for the PU of the current video block, motion compensation unit 44 may locate the predictive block to which the motion vector points in one of the reference picture lists, or in the case of the IBC coding, within the picture being coded. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44 or IBC performed by IBC unit 48, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction, intra-prediction, or IBC, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive binary arithmetic coding (CABAC) or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Interpolation filtering may generate additional pixel samples from known pixel samples, thus potentially increasing the number of candidate predictive blocks that may be used to code a video block. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter-predict a block in a subsequent video frame or picture.

Video encoder 20 represents an example of a video encoder configured to encode video data in accordance with the techniques of this disclosure. For example, video encoder 20 may determine a CTB delay for one or more blocks coded with WPP enabled. The CTB delay may, for example, identify a delay between when a first row of CTBs starts being decoded and when a second row of CTBs below the first row of CTBs starts being decoded. For a first block of video data coded in an intra-block copy (IBC) mode and coded with WPP disabled, video encoder 20 may determine an IBC prediction region for the first block based on the CTB delay. Video encoder 20 may identify, from within the IBC prediction region for the first block, a predictive block for the first block and generate syntax to indicate a block vector for locating the predictive block.

Figure 16:
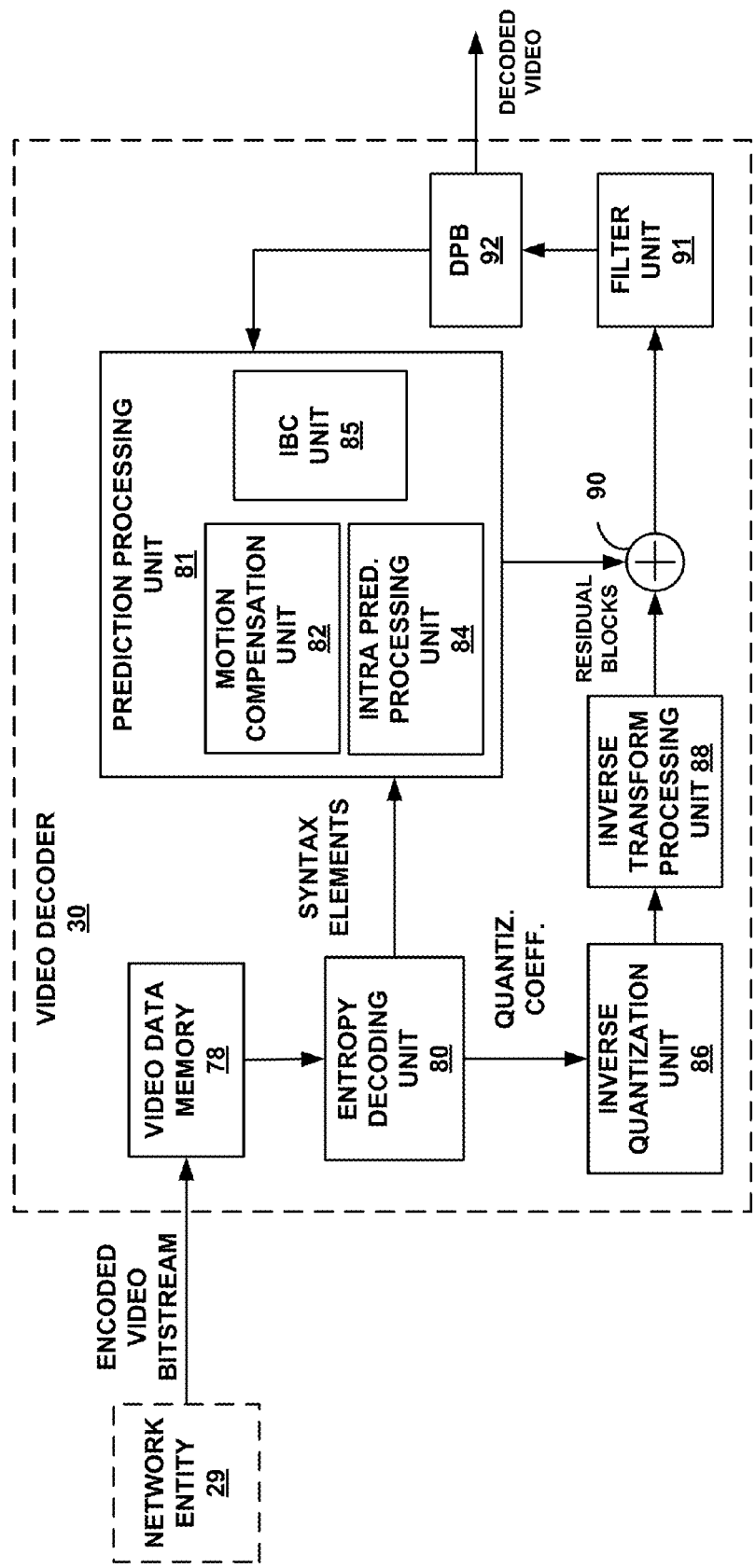
FIG. 16 is a block diagram illustrating an example video decoder that may implement the techniques described in this disclosure.

FIG. 16 is a block diagram illustrating an example video decoder 30 that may implement the techniques described in this disclosure. In the example of FIG. 16, video decoder 30 includes a video data memory 78, entropy decoding unit 80, prediction processing unit 81, inverse quantization unit 86, inverse transform processing unit 88, summer 90, filter unit 91, and decoded picture buffer (DPB) 92. Prediction processing unit 81 includes motion compensation unit 82, intra-prediction processing unit 84, and IBC unit 85. Video decoder 30 may, in some examples, perform a decoding pass generally reciprocal to the encoding pass described with respect to video encoder 20 from FIG. 15.

In various examples, a unit of video decoder 30 may be tasked to perform the techniques of this disclosure. Also, in some examples, the techniques of this disclosure may be divided among one or more of the units of video decoder 30. For example, IBC unit 85 may perform the techniques of this disclosure, alone, or in combination with other units of video decoder 30, such as motion compensation unit 82, intra-prediction processing unit 84, and entropy decoding unit 80. In some examples, video decoder 30 may not include IBC unit 85 and the functionality of IBC unit 85 may be performed by other components of prediction processing unit 81, such as motion compensation unit 82.

During the decoding process, video decoder 30 receives video data, e.g. an encoded video bitstream that represents video blocks of an encoded video slice and associated syntax elements, from video encoder 20. Video decoder 30 may receive the video data from network entity 29 and store the video data in video data memory 78. Video data memory 78 may store video data, such as an encoded video bitstream, to be decoded by the components of video decoder 30. The video data stored in video data memory 78 may be obtained, for example, from storage device 17, e.g., from a local video source, such as a camera, via wired or wireless network communication of video data, or by accessing physical data storage media. Video data memory 78 may form a coded picture buffer that stores encoded video data from an encoded video bitstream. Thus, although shown separately in FIG. 16, video data memory 78 and DPB 92 may be provided by the same memory device or separate memory devices. Video data memory 78 and DPB 92 may be formed by any of a variety of memory devices, such as dynamic random access memory (DRAM), including synchronous DRAM (SDRAM), magnetoresistive RAM (MRAM), resistive RAM (RRAM), or other types of memory devices. In various examples, video data memory 78 may be on-chip with other components of video decoder 30, or off-chip relative to those components.

Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30. Network entity 29 may be an example of storage device 17 of FIG. 1 in some cases.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e. B or P) slice or when a block is IBC coded, motion compensation unit 82 of prediction processing unit 81 produces predictive blocks for a video block of the current video slice based on the motion vectors and other syntax elements received from entropy decoding unit 80. For inter prediction, the predictive blocks may be produced from one of the reference pictures within one of the reference picture lists. Video decoder 30 may construct the reference frame lists, List 0 and List 1, using default construction techniques based on reference pictures stored in DPB 92. For IBC coding, the predictive blocks may be produced from the same picture as the block being predicted.

In other examples, when the video block is coded according to the IBC mode described herein, IBC unit 85 of prediction processing unit 81 produces predictive blocks for the current video block based on block vectors and other syntax elements received from entropy decoding unit 80. The predictive blocks may be within a reconstructed region within the same picture as the current video block defined by video encoder 20, and retrieved from DPB 92.

Motion compensation unit 82 and/or IBC unit 85 may determine prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra or inter prediction) used to code the video blocks of the video slice, an inter prediction slice type (e.g., B slice or P slice), construction information for one or more of the reference picture lists for the slice, motion vectors for each inter encoded video block of the slice, inter prediction status for each inter coded video block of the slice, and other information to decode the video blocks in the current video slice.

Similarly, IBC unit 85 may use some of the received syntax elements, e.g., a flag, to determine that the current video block was predicted using the IBC mode, construction information indicating which video blocks of the picture are within the reconstructed region and should be stored in DPB 92, block vectors for each IBC predicted video block of the slice, IBC prediction status for each IBC predicted video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 or IBC unit 85 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 16 as being an in loop filter, in other configurations, filter unit 91 may be implemented as a post loop filter. The decoded video blocks in a given frame or picture are then stored in DPB 92, which stores reference pictures used for subsequent motion compensation. DPB 92 may be part of a memory that also stores decoded video for later presentation on a display device, such as display device 32 of FIG. 1, or may be separate from such a memory.

Video decoder 30 represents an example of a video decoder configured to decode video data in accordance with the techniques of this disclosure. For one or more blocks coded with WPP enabled, video decoder 30 determines CTB delay that identifies a delay between when a first row of CTBs starts being decoded and when a second row of CTBs below the first row of CTBs starts being decoded. The CTB delay may, for example, be in units of CTBs. For a current block of video data coded in an IBC mode and coded with WPP disabled, video decoder 30 determines an IBC prediction region for the current block within a picture that includes the current block based on the CTB delay that was determined for the one or more blocks coded with WPP enabled. Video decoder 30 identifies, from within the determined IBC prediction region for the current block, a predictive block for the current block and IBC decodes the current block based on the predictive block. For a second block of video data coded in the IBC mode and coded with WPP enabled, video decoder 30 may also determine an IBC prediction region for the second block based on the CTB delay and identify, from within the IBC prediction region for the second block, a predictive block for the second block; an IBC decode the current block based on the predictive block.

Video decoder 30 may, for example, determine that WPP is disabled for the first block based on a value of the syntax element (e.g. entropy_coding_sync_enabled described above). The syntax element may, for example, be a synchronization process enabling syntax element that indicates if a specific synchronization process for context variables is to be invoked.

The IBC prediction region for the first block may include previously decoded unfiltered CTBs. Additionally or alternatively, the IBC prediction region may include a diagonally located CTB located to the right of the first block and at least two or more rows above the first block and excludes a CTB directly below the diagonally located CTB. For a diagonally located CTB, video decoder 30 may decode the CTB directly below the diagonally located CTB in parallel with the first block.

Video decoder 30 may receive, in an encoded bitstream of video data, one or more syntax elements indicating that a coding mode for the first block of video data is the IBC mode and receive in the encoded bitstream of video data, one or more syntax elements identifying a block vector for the first block of video data. To identify, from within the IBC prediction region for the first block, the predictive block for the first block, video decoder 30 may locate the predictive block with the block vector.

Figure 17:
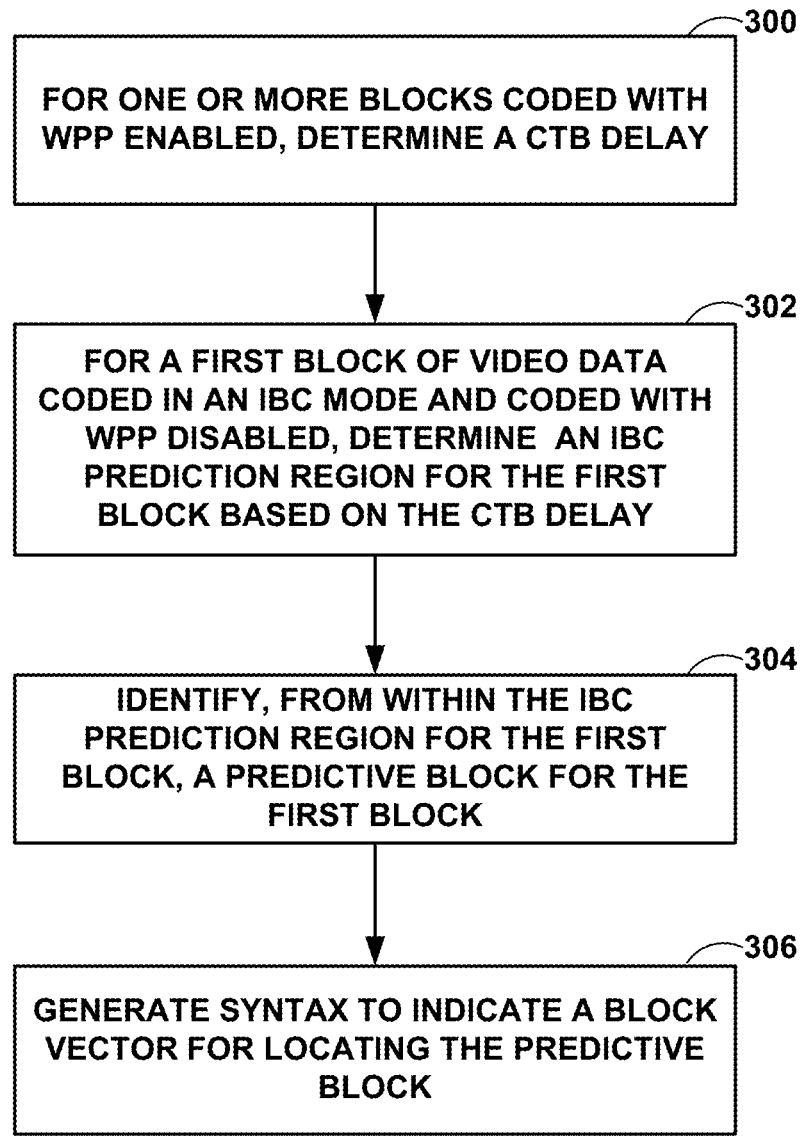
FIG. 17 is a block diagram illustrating an example video encoding process that incorporates techniques described in this disclosure.

FIG. 17 is a flow diagram illustrating techniques for encoding video data according to the techniques of this disclosure. The techniques of FIG. 17 will be described with references to a generic video encoder. The generic video encoder may incorporate features of video encoder 20 or may be a different configuration of video encoder. For one or more blocks coded with WPP enabled, the video encoder determines a CTB delay (300). The CTB delay identifies, in units of CTBs, a delay between when a first row of CTBs starts being decoded and when a second row of CTBs below the first row of CTBs starts being decoded. The CTB delay may, for example, be one CTB, two CTBs, or some other such delay. For a first block of video data coded in an IBC mode and coded with WPP disabled, the video encoder determines an IBC prediction region for the first block based on the CTB delay (302). The video encoder identifies, from within the IBC prediction region for the first block, a predictive block for the first block (304) and generates syntax to indicate a block vector for locating the predictive block (306).

For a second block of video data coded in the IBC mode and coded with WPP enabled, the video encoder may determine an IBC prediction region for the second block based on the CTB delay and identify, from within the IBC prediction region for the second block, a predictive block for the second block. The IBC prediction region may include a CTB to the right of the first block and at least two or more rows above the first block and exclude a CTB directly below the CTB to the right of the first block and at least two or more rows above the first block.

Figure 18:
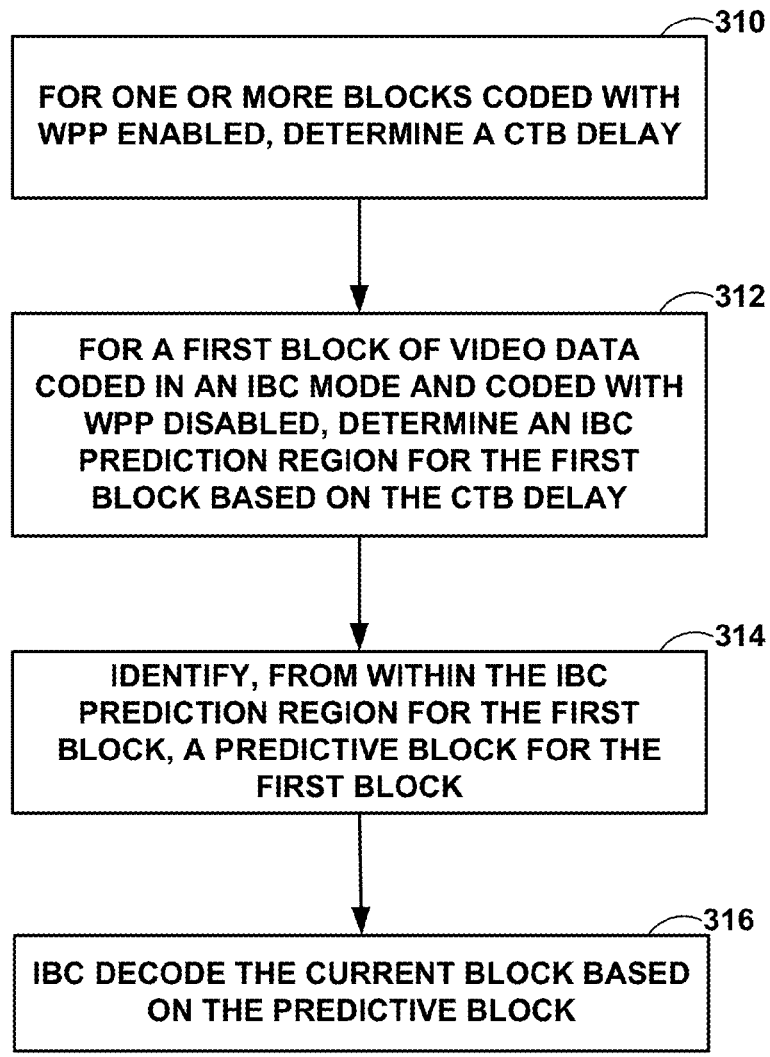
FIG. 18 is a block diagram illustrating an example video decoding process that incorporates techniques described in this disclosure.

FIG. 18 is a flow diagram illustrating techniques for decoding video data according to the techniques of this disclosure. The techniques of FIG. 18 will be described with references to a generic video decoder. The generic video decoder may incorporate features of video decoder 30 or may be a different configuration of video decoder. For one or more blocks coded with WPP enabled, the video decoder determines CTB delay (310). The CTB delay identifies, in units of CTBs, a delay between when a first row of CTBs starts being decoded and when a second row of CTBs below the first row of CTBs starts being decoded. The CTB delay may, for example, be one CTB, two CTBs, or some other such delay. For a first block of video data coded in an IBC mode and coded with WPP disabled, the video decoder determines an IBC prediction region for the first block based on the CTB delay (312). The video decoder identifies, from within the IBC prediction region for the first block, a predictive block for the first block (314). Video decoder 30 IBC decodes the current block based on the predictive block (316).

For a second block of video data coded in the IBC mode and coded with WPP enabled, the video decoder determines an IBC prediction region for the second block based on the CTB delay and identifies, from within the IBC prediction region for the second block, a predictive block for the second block. The video decoder may additionally, receive a syntax element and determine that WPP is disabled for the first block based on a value of the syntax element. The syntax element may, for example, be a synchronization process enabling syntax element (e.g. entropy_coding_sync_enabled_flag described above) that indicates if a specific synchronization process for context variables is to be invoked.

The IBC prediction region for the first block may, for example, include previously decoded unfiltered CTBs. The IBC prediction region may, for example, include a CTB to the right of the first block and at least two or more rows above the first block and excludes a CTB directly below the CTB to the right of the first block and at least two or more rows above the first block. The video decoder may decode the CTB directly below the CTB to the right of the first block and at least two or more rows above the first block in parallel with the first block.

The video decoder may additionally receive, in an encoded bitstream of video data, one or more syntax elements indicating a coding mode for the first block of video data is the IBC mode and receive in the encoded bitstream of video data, one or more syntax elements identifying a block vector for the first block of video data. To identify, from within the IBC prediction region for the first block, the predictive block for the first block, the video decoder may locate the predictive block with the block vector.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
 determining that a first block of video data in a first picture is coded in an intra block copy (IBC) mode, wherein the first block of video data is in a first row of coding tree blocks (CTBs);

determining that the first block of video data is coded with wavefront parallel processing enabled;

determining a shape of an IBC prediction region for the first block using a CTB delay for the first block of video data, wherein the CTB delay specifies a delay between when the first row of CTBs starts being decoded and when a second row of CTBs above the first row of CTBs starts being decoded;

identifying, from within the IBC prediction region for the first block, a predictive block for the first block;

IBC decoding the first block based on the predictive block for the first block;

determining that a second block of video data in a second picture is coded in the IBC mode;

determining that the second block of video data is coded with wavefront parallel processing disabled;

determining a shape of an IBC prediction region for the second block based on the CTB delay that was used for the first block;

identifying, from within the determined IBC prediction region for the second block, a predictive block for the second block; and IBC decoding the second block based on the predictive block.

2. The method of claim 1, further comprising:
receiving a syntax element; and
determining that wavefront parallel processing is disabled for the second block based on a value of the syntax element.

3. The method of claim 2, wherein the syntax element comprises a synchronization process enabling syntax element that indicates if a specific synchronization process for context variables is to be invoked.

4. The method of claim 1, wherein the IBC prediction region for the second block comprises previously decoded unfiltered CTBs.

5. The method of claim 1, wherein the IBC prediction region includes a diagonally located CTB located to the right of the second block and at least two or more rows above the second block and excludes a CTB directly below the diagonally located CTB.

6. The method of claim 5, further comprising:
decoding the CTB directly below the diagonally located CTB in parallel with the second block.

7. The method of claim 1, wherein the CTB delay comprises a delay of one CTB.

8. The method of claim 1, further comprising:
receiving, in an encoded bitstream of video data, one or more syntax elements indicating that a coding mode for the second block of video data is the IBC mode;
receiving in the encoded bitstream of video data, one or more syntax elements identifying a block vector for the second block of video data, wherein identifying, from within the IBC prediction region for the second block, the predictive block for the second block comprises locating the predictive block with the block vector.

9. The method of claim 1, wherein determining the CTB delay comprises determining the CTB delay in units of CTBs.

10. A method of encoding video data, the method comprising:
determining that a first block of video data in a first picture is coded in an intra block copy (IBC) mode, wherein the first block of video data is in a first row of coding tree blocks (CTBs);
determining that the first block of video data is coded with wavefront parallel processing enabled;

determining a shape of an IBC prediction region for the first block using a CTB delay for the first block of video data, wherein the CTB delay specifies a delay between when the first row of CTBs starts being decoded and when a second row of CTBs above the first row of CTBs starts being decoded;

identifying, from within the IBC prediction region for the first block, a first predictive block for the first block;

generating first syntax to indicate a first block vector for locating the first predictive block;

determining that a second block of video data in a second picture is coded in the IBC mode;

determining that the second block of video data is coded with wavefront parallel processing disabled;

determining a shape of an IBC prediction region for the second block based on the CTB delay that was used for the first block;

identifying, from within the determined IBC prediction region for the second block, a second predictive block for the second block; and generating second syntax to indicate a second block vector for locating the second predictive block.

11. The method of claim 10, wherein the IBC prediction region includes a CTB to the right of the second block and at least two or more rows above the second block and excludes a CTB directly below the CTB to the right of the second block and at least two or more rows above the second block.

12. The method of claim 10, wherein the CTB delay comprises a two CTB delay.

13. A device for performing video decoding, the device comprising:
a memory to store video data;
one or more processors configured to:
determine that a first block of video data in a first picture is coded in an intra block copy (IBC) mode, wherein the first block of video data is in a first row of coding tree blocks (CTBs);
determine that the first block of video data is coded with wavefront parallel processing enabled;
determine a shape of an IBC prediction region for the first block using a CTB delay for the first block of video data, wherein the CTB delay specifies a delay between when the first row of CTBs starts being decoded and when a second row of CTBs above the first row of CTBs starts being decoded;
identify, from within the IBC prediction region for the first block, a predictive block for the first block;
IBC decode the first block based on the predictive block for the first block;
determine that a second block of video data in a second picture is coded in the IBC mode;
determine that the second block of video data is coded with wavefront parallel processing disabled;
determine a shape of an IBC prediction region for the second block based on the CTB delay that was used for the first block;
identify, from within the determined IBC prediction region for the second block, a predictive block for the second block; and
IBC decode the second block based on the predictive block.

14. The device of claim 13, wherein the one or more processors are further configured to:

receive a syntax element; and
determine that wavefront parallel processing is disabled for the second block based on a value of the syntax element.

15. The device of claim 14, wherein the syntax element comprises a synchronization process enabling syntax element that indicates if a specific synchronization process for context variables is to be invoked.

16. The device of claim 13, wherein the IBC prediction region for the second block comprises previously decoded unfiltered CTBs.

17. The device of claim 13, wherein the IBC prediction region includes a diagonally located CTB located to the right of the second block and at least two or more rows above the second block and excludes a CTB directly below the diagonally located CTB.

18. The device of claim 17, wherein the one or more processors are further configured to:
decode the CTB directly below the diagonally located CTB in parallel with the second block.

19. The device of claim 13, wherein the CTB delay comprises a one CTB delay.

20. The device of claim 13, wherein the one or more processors are further configured to:
receive, in an encoded bitstream of video data, one or more syntax elements indicating that a coding mode for the second block of video data is the IBC mode; and
receive in the encoded bitstream of video data, one or more syntax elements identifying a block vector for the second block of video data, wherein identifying, from within the IBC prediction region for the second block, the predictive block for the second block comprises locating the predictive block with the block vector.

21. The device of claim 13, wherein to determine the CTB delay, the one or more processors are further configured to determine the CTB delay in units of CTBs.

22. The device of claim 13, wherein the device comprises at least one of:
an integrated circuit;
a microprocessor; or
a wireless communication device comprising a display.

23. A device for performing video encoding, the device comprising:
a memory to store video data;
one or more processors configured to:
determine that a first block of video data in a first picture is coded in an intra block copy (IBC) mode, wherein the first block of video data is in a first row of coding tree blocks (CTBs);
determine that the first block of video data is coded with wavefront parallel processing enabled;
determine a shape of an IBC prediction region for the first block using a CTB delay for the first block of video data, wherein the CTB delay specifies a delay between when the first row of CTBs starts being decoded and when a second row of CTBs above the first row of CTBs starts being decoded;
identify, from within the IBC prediction region for the first block, a first predictive block for the first block;
generate first syntax to indicate a first block vector for locating the first predictive block;
determine that a second block of video data in a second picture is coded in the IBC mode;
determine that the second block of video data is coded with wavefront parallel processing disabled;
determine a shape for an IBC prediction region for the second block based on the CTB delay that was used for the first block;
identify, from within the determined IBC prediction region for the second block, a second predictive block for the second block; and
generate second syntax to indicate a second block vector for locating the second predictive block.

24. The device of claim 23, wherein the IBC prediction region includes a CTB to the right of the second block and at least two or more rows above the second block and excludes a CTB directly below the CTB to the right of the second block and at least two or more rows above the second block.

25. The device of claim 23, wherein the CTB delay comprises a one CTB delay.

26. The device of claim 23, wherein the device comprises at least one of:
an integrated circuit;
a microprocessor; or
a wireless communication device comprising a camera.

27. An apparatus for decoding video data, the apparatus comprising:
means for determining that a first block of video data in a first picture is coded in an intra block copy (IBC) mode, wherein the first block of video data is in a first row of coding tree blocks (CTBs);
means for determining that the first block of video data is coded with wavefront parallel processing enabled;
means for determining a shape of an IBC prediction region for the first block using a CTB delay for the first block of video data, wherein the CTB delay specifies a delay between when the first row of CTBs starts being decoded and when a second row of CTBs above the first row of CTBs starts being decoded;
means for identifying, from within the IBC prediction region for the first block, a predictive block for the first block;
means for IBC decoding the first block based on the predictive block for the first block;
means for determining that a second block of video data in a second picture is coded in the IBC mode;
means for determining that the second block of video data is coded with wavefront parallel processing disabled;
means for determining a shape of an IBC prediction region for the second block based on the CTB delay that was used for the first block;
means for identifying, from within the determined IBC prediction region for the second block, a predictive block for the second block; and
means for IBC decoding the second block based on the predictive block.

28. A non-transitory computer readable storage medium storing instructions that when executed by one or more processors cause the one or more processors to:
determine that a first block of video data in a first picture is coded in an intra block copy (IBC) mode, wherein the first block of video data is in a first row of coding tree blocks (CTBs);
determine that the first block of video data is coded with wavefront parallel processing enabled;
determine a shape of an IBC prediction region for the first block using a CTB delay for the first block of video data, wherein the CTB delay specifies a delay between when the first row of CTBs starts being decoded and when a second row of CTBs above the first row of CTBs starts being decoded;

identify, from within the IBC prediction region for the first block, a predictive block for the first block;

IBC decode the first block based on the predictive block for the first block;

determine that a second block of video data in a second picture is coded in the IBC mode;

determine that the second block of video data is coded with wavefront parallel processing disabled;

determine a shape of an IBC prediction region for the second block based on the CTB delay that was used for the first block;

identify, from within the determined IBC prediction region for the second block, a predictive block for the second block; and IBC decode the second block based on the predictive block.

* * * * *